US010387565B2

(12) United States Patent
Hoover et al.

(10) Patent No.: US 10,387,565 B2
(45) Date of Patent: Aug. 20, 2019

(54) SYSTEMS AND METHODS FOR ADVANCED GRAMMAR CHECKING

(71) Applicant: Grammarly, Inc., San Francisco, CA (US)

(72) Inventors: Bradley Hoover, Gainesville, FL (US); Maksym Lytvyn, Toronto (CA); Oleksiy Shevchenko, Toronto (CA)

(73) Assignee: Grammarly, Inc., San Francisco, CA (US)

( * ) Notice: Subject to any disclaimer, the term of this patent is extended or adjusted under 35 U.S.C. 154(b) by 6 days.

(21) Appl. No.: 15/249,986

(22) Filed: Aug. 29, 2016

(65) Prior Publication Data

US 2016/0371248 A1 Dec. 22, 2016

Related U.S. Application Data

(63) Continuation of application No. 14/617,338, filed on Feb. 9, 2015, now Pat. No. 9,465,793, which is a continuation of application No. 13/107,501, filed on May 13, 2011, now Pat. No. 9,002,700.

(60) Provisional application No. 61/334,321, filed on May 13, 2010.

(51) Int. Cl.
*G06F 17/24* (2006.01)
*G06F 17/27* (2006.01)

(52) U.S. Cl.
CPC .......... *G06F 17/274* (2013.01); *G06F 17/271* (2013.01); *G06F 17/2705* (2013.01); *G06F 17/2775* (2013.01)

(58) Field of Classification Search
USPC ................. 704/9, 235, 257, 270, 270.1, 275
See application file for complete search history.

(56) References Cited

U.S. PATENT DOCUMENTS

| 5,164,899 | A | 11/1992 | Sobotka et al. |
|---|---|---|---|
| 5,610,812 | A | 3/1997 | Schabes et al. |
| 5,678,053 | A | 10/1997 | Anderson |
| 5,870,700 | A | 2/1999 | Parra et al. |
| 5,890,177 | A | 3/1999 | Moody et al. |
| 5,920,835 | A | 7/1999 | Huzenlaub et al. |
| 5,963,894 | A | 10/1999 | Richardson et al. |
| 6,012,075 | A | 1/2000 | Fein et al. |

(Continued)

FOREIGN PATENT DOCUMENTS

WO 9749043 A1 12/1997

OTHER PUBLICATIONS

Sun, et al., "Detecting erroneous sentences using automatically mined sequential patterns", Annual Meeting—Association for Computational Linguistics, 2007,Citeseer,, 8 Pages.

(Continued)

*Primary Examiner* — Abul K Azad
(74) *Attorney, Agent, or Firm* — GTC Law Group PC & Affiliates

(57) ABSTRACT

In embodiments of the present invention improved capabilities are described for methods and systems of grammar checking comprising a grammar checking facility and a plurality of human proofreaders in a crowd-source population for the detection and correction of grammatical errors in text as received from a computing device, wherein possible detected errors are categorized as high confidence or low confidence possible errors, and the high confidence errors are distributed to the human proofreaders.

20 Claims, 27 Drawing Sheets

(56) References Cited

U.S. PATENT DOCUMENTS

| | | | |
|---|---|---|---|
| 6,049,767 | A | 4/2000 | Printz |
| 6,173,259 | B1 | 1/2001 | Bijl et al. |
| 6,360,201 | B1 | 3/2002 | Lewis et al. |
| 6,832,189 | B1 | 12/2004 | Kanevsky et al. |
| 6,857,022 | B1 | 2/2005 | Scanlan et al. |
| 6,895,084 | B1 | 5/2005 | Saylor et al. |
| 6,988,063 | B2 | 1/2006 | Tokuda et al. |
| 7,027,974 | B1 | 4/2006 | Busch et al. |
| 7,184,950 | B2 | 2/2007 | Weise et al. |
| 7,483,833 | B2 | 1/2009 | Peters |
| 7,720,675 | B2 | 5/2010 | Burstein et al. |
| 7,991,609 | B2 | 8/2011 | Brockett et al. |
| 8,014,996 | B1 | 9/2011 | Kinder et al. |
| 8,041,565 | B1 | 10/2011 | Bhardwaj et al. |
| 8,185,378 | B2 | 5/2012 | Burstein et al. |
| 8,290,206 | B1 | 10/2012 | Meyers |
| 8,412,516 | B2 | 4/2013 | Verma et al. |
| 8,479,094 | B2 | 7/2013 | Fouts et al. |
| 8,548,995 | B1 | 10/2013 | Curtiss |
| 9,002,700 | B2 * | 4/2015 | Hoover .................. G06F 17/274 704/9 |
| 9,465,793 | B2 * | 10/2016 | Hoover .................. G06F 17/274 |
| 2002/0002459 | A1 | 1/2002 | Lewis et al. |
| 2002/0124048 | A1 | 9/2002 | Zhou et al. |
| 2002/0198875 | A1 | 12/2002 | Masters |
| 2003/0018469 | A1 | 1/2003 | Humphreys et al. |
| 2003/0036900 | A1 | 2/2003 | Weise et al. |
| 2003/0110149 | A1 | 6/2003 | Wen et al. |
| 2003/0200093 | A1 | 10/2003 | Lewis et al. |
| 2003/0212541 | A1 | 11/2003 | Kinder |
| 2004/0122769 | A1 | 6/2004 | Bailo et al. |
| 2004/0217944 | A1 | 11/2004 | Kong et al. |
| 2005/0060150 | A1 | 3/2005 | Li et al. |
| 2005/0142529 | A1 | 6/2005 | Andreyev et al. |
| 2005/0246158 | A1 | 11/2005 | Weise |
| 2006/0026003 | A1 | 2/2006 | Carus et al. |
| 2006/0101117 | A1 | 5/2006 | Yabe et al. |
| 2006/0123329 | A1 | 6/2006 | Steen et al. |
| 2006/0136196 | A1 | 6/2006 | Brun et al. |
| 2006/0200337 | A1 | 9/2006 | Cipollone et al. |
| 2006/0282267 | A1 | 12/2006 | Lopez-Barquilla et al. |
| 2006/0294067 | A1 | 12/2006 | Halcrow et al. |
| 2007/0106494 | A1 | 5/2007 | Detlef et al. |
| 2007/0271510 | A1 | 11/2007 | Grigoriu et al. |
| 2007/0294076 | A1 | 12/2007 | Shore et al. |
| 2008/0028003 | A1 | 1/2008 | Brueggemann et al. |
| 2008/0052272 | A1 | 2/2008 | Altaf et al. |
| 2008/0082315 | A1 | 4/2008 | Shimohata et al. |
| 2008/0103759 | A1 | 5/2008 | Dolan et al. |
| 2008/0109739 | A1 | 5/2008 | Khan et al. |
| 2008/0221892 | A1 | 9/2008 | Nathan et al. |
| 2009/0043563 | A1 | 2/2009 | Bode et al. |
| 2009/0064330 | A1 | 3/2009 | Shraim et al. |
| 2009/0076792 | A1 | 3/2009 | Lawson-Tancred |
| 2009/0192787 | A1 | 7/2009 | Roon |
| 2009/0198488 | A1 | 8/2009 | Vigen |
| 2009/0300488 | A1 | 12/2009 | Salamon et al. |
| 2009/0307183 | A1 | 12/2009 | Vigen |
| 2010/0031143 | A1 | 2/2010 | Rao et al. |
| 2010/0125450 | A1 | 5/2010 | Michaelangelo et al. |
| 2010/0311030 | A1 | 12/2010 | He et al. |
| 2010/0332217 | A1 | 12/2010 | Wintner et al. |
| 2010/0332974 | A1 | 12/2010 | Thomas |
| 2011/0185284 | A1 | 7/2011 | Allen et al. |
| 2011/0201387 | A1 | 8/2011 | Paek et al. |
| 2011/0202426 | A1 | 8/2011 | Cretney et al. |
| 2011/0313757 | A1 | 12/2011 | Hoover et al. |
| 2012/0221945 | A1 | 8/2012 | Dukhon et al. |
| 2015/0154174 | A1 | 6/2015 | Hoover |
| 2015/0309983 | A1 | 10/2015 | Hoover et al. |
| 2016/0246772 | A1 | 8/2016 | Hoover et al. |

OTHER PUBLICATIONS

Sun, et al., "Mining sequential patterns and tree patterns to detect erroneous sentences", 6 Pages.

U.S. Appl. No. 13/107,490, filed May 13, 2011.

U.S. Appl. No. 14/617,350, filed Feb.

\* cited by examiner

Detailed report

Citation Audit  85% unoriginal

Contextual Spelling Check  2 suggestions.
  Commonly confused words  2 suggestions
  Spelling  OK Grammar  27 suggestions
  Use of articles  4 suggestions
  Use of conjunctions  OK
  Use of nouns  OK
  Incorrect use of numbers  OK
  Incorrect use of prepositions  2 suggestions
  Pronoun agreement  OK
  Use of adjectives and adverbs  2 suggestions
  Comparing two or more things  1 suggestion
  Faulty parallelism  1 suggestion
  Confusing modifiers  1 suggestion
  Incorrect use of negatives  1 suggestion
  Use of qualifiers and quantifiers  OK
  Subject and verb agreement  1 suggestion

Citation audit

A part of your paper is matching some text from the Web. Please make sure that this text is properly referenced.

Web source:
http://www.echeat.com/essay.php?t=28448

Consider using one of the following pre-formatted references or write your own reference in using the appropriate format:

MLA: Free Essay Twelfth Night - Character Study: Malvolio." Insert Name of Site in Italics. N.p., n.d. Web. 2 Feb. 2010 <http://www.echeat.com/essay.php?t=28448>.

APA: Free Essay Twelfth Night - Character Study: Malvolio. (n.d.). Retrieved from http://www.echeat.com/essay.php?t=28448

Chicago: Free Essay Twelfth Night - Character Study: Malvolio, http://www.echeat.com/essay.php?t=28448 (accessed February 2, 2010).

FIG. 20

| HIGH/CRITICAL ERRORS | MEDIUM ERRORS | LOW ERRORS | VERY LOW/FYI ERRORS |
|---|---|---|---|
| SENTENCE FRAGMENTS | INCOMPLETE COMPARISON | AWKWARDNESS OR WORDINESS | WORD OVERUSE |
| VERB-NUMBER AGREEMENT | MISPLACED/DANGLING MODIFIERS | IMPROPER ADVERB OR ADJ FORM | PASSIVE VOICE USE |
| TENSE CONSISTENCY | PRONOUN-ANTECEDENT AGREEMENT | ARTICLE ERRORS | SYNONYMS AND WORD SUGGESTION |
| THERE, THEIR, THEY'RE | DICTION/WORD-CHOICE ERRORS | OMISSION OF 'THAT' FROM A NOUN CLAUSE | |
| USE OF NON-EXISTENT CONTRACTIONS (E.G. COULD'VE) | MIS-USE OF PASSIVE CONSTRUCTION (NOT TO BE CONFUSED WITH GENERAL PASSIVE VOICE USE) | INCORRECT USE OF SUBJUNCTIVE MOOD (THESE MAY FALL UNDER CONDITIONAL ERRORS) | |
| UNCLEAR SUBJECT | FAULTY PARALLELISM | MISSPELLING | |
| UNCLEAR SENTENCE CONSTRUCTION / RUN-ON SENTENCE | | | |
| COMMA SPLICE | | | |
| MADE-UP WORDS | | | |
| APPROPRIATE WORD-ORDER | | | |
| CORRECT PRONOUN USE | | | |

SYSTEMS AND METHODS FOR ADVANCED GRAMMAR CHECKING

CROSS-REFERENCE TO RELATED APPLICATIONS

This application is a continuation of U.S. application Ser. No. 14/617,338, filed Feb. 9, 2015 (APLN-0002-U02-C01), which is a continuation of U.S. application Ser. No. 13/107,501, filed May 13, 2011 (APLN-0002-U02), which claims the benefit of U.S. Provisional Application Ser. No. 61/334,321 filed May 13, 2010.

All of the above-mentioned applications are hereby incorporated herein by reference in their entirety.

BACKGROUND

Field

The present disclosure relates to language processing, and more specifically to a computer implemented grammar-checking facility.

Description of the Related Art

In computing, application programs that flag words and sentences for grammatical correctness have been available for many years. However, grammar checkers often fail to spot errors or incorrectly flag correct text as erroneous. Therefore improved facilities for grammar checking are needed.

SUMMARY

Methods and systems may provide for a grammar checking facility to improve the quality of computer-based grammar checking to a user of a personal computing device, such as through a text processing engine. Text content sources for grammar checking may include documents, text input, word processing generated documents, scanned source documents, books, magazines, email, SMS messages, and the like from the user, as well as from across the Internet, such as from searches, web pages, document storage sites, e-books, and the like. Text content may be associated with a plurality of content generation environments, including academics, productivity tools, job searching, legal, healthcare, police reports, government, consumer support, customer reviews, search engine optimization professionals, marketing professionals, advertising professionals, call center support, post-translation quality control, language learning, dialect accommodation service, and the like. Text content may be generated by the user, provided by the user but sourced through the Internet, provided directly to the grammar checking facility, and the like.

In embodiments, a method of grammar checking may comprise providing a first level of grammar checking through a computer-based grammar checking facility to grammar check a body of text provided by a source in order to improve the grammatical correctness of the text; providing an excerpt of the body of text containing an identified grammatical error as a result of the first level of automated grammar checking to a second level of human augmented grammar checking consisting of at least one human proofreader for review; incorporating the results of the human proofreader review to contribute to an at least one corrected version of the provided body of text; and sending the at least one corrected version back the source. The source may be a user, a device, a computer program, and the like. The at least one corrected version may include a plurality of corrected excerpts integrated back into the original text where the source receives the entire text with mistakes corrected. The error may be provided to the second level of grammar checking for assessment in multiple choice format, for assessment in short answer format, for assessment in free form format, along with guidance for assessing the error, and the like. The second level of grammar checking may include accepting the correction based on a ranking of the human proofreader. The source may not review the corrected version before an action may be performed. The action may be related to sending an email. The source may review the corrected version and accepts the changes before performing an action. The body of text may be an email text. The email may be automatically sent without review by the source. The at least one corrected version may be a redline version. The at least one corrected version may be a clean version. The excerpt of text may be obfuscated as sent to the at least one proofreader. The proofreader may be a part of a crowd source. The crowd source may be a social network crowd source, an authoritative crowd source, a work management source, an individual, and the like.

In embodiments, a system of grammar checking may comprise a grammar checking facility utilizing software-based grammar checking augmented with crowd-sourced human proofreading to analyze and correct a source-supplied text for grammatical errors, wherein a source provides the grammar checking facility with text to the grammar checking facility, the grammar checking facility performs a software-based grammar checking analysis of the text for grammatical errors, passes portions of the source-supplied text containing errors to at least one crowd-sourced human proofreader, managing use of the at least one human proofreader through algorithmic checking mechanisms, and providing the source with text including at least a subset of the identified grammatical errors corrected. The source may be a user, a device, a computer program, and the like. The crowd source may be a social network crowd source, an authoritative crowd source, a work management source, an individual, and the like.

In embodiments, a system for customized grammar teaching may be based on source-provided text comprising a database of grammar rules, wherein each grammatical rule may be linked to a generic reference content and a plain-language explanation; a text processing engine operable to apply the grammatical rules to the source-provided text to determine grammatical errors; and synthesized feedback for each grammatical error that includes the generic reference content and customized feedback, wherein the customized feedback embeds the source-provided text that caused the grammatical error into the plain-language explanation. The source may be a user, a device, a computer program, and the like. Further, a user interface utility may be linked to the text processing engine, the user interface utility operable to provide the text and the feedback to the source.

In embodiments, a system of grammar checking may comprise a text processing engine to analyze a source-supplied text for grammatical errors, and a database of one or more grammatical rules, each grammatical rule linked to generic reference content and a plain-language explanation, and where the text processing engine operably applies one or more of the grammatical rules to the source-provided text to determine grammatical errors and, for each grammatical error, synthesize feedback that includes the generic reference content and customized feedback, the customized feedback embedding the source-provided text causing the grammatical error to be included in the plain-language explanation. The source may be a user, a device, a computer program, and the like. The process may be performed in a cloud computing environment.

In embodiments, a method of grammar checking may comprise providing a computer-based grammar checking facility to grammar check a body of text provided by a source in order to improve the grammatical correctness of the text; and linking a grammatical rule from a rules database to a generic reference content and a plain-language explanation, where the text processing engine operably applies one or more of the grammatical rules to the source-provided text to determine grammatical errors and, for each grammatical error, synthesize feedback that includes the generic reference content and customized feedback, the customized feedback embedding the source-provided text causing the grammatical error into the plain-language explanation. The source may be a user, a device, a computer program, and the like. Source mistakes may be used in a particular document in order to teach grammar, wherein the teaching is conveyed through presenting explanations including original text of source mistakes in explanations and considering past source mistakes to assemble a writing reference guide customized for the source. The writing guide may not reference a particular text. The writing guide content may be selected based on the source's specific writing problems. The processing engine may account for the genre of the text, the context of the text, the type of source, the persona of the source, the type of user, the persona of the user, and the like.

In embodiments, a method of teaching may comprise abstracting an excerpt of text into patterns; comparing the abstracted patterns to known patterns to assess grammatical errors in the excerpt of text; and presenting to a source a remedial guide with explanations of grammatical errors contained in the excerpt of text, wherein the remedial guide includes the text of the excerpt in the explanations, such text inserted based on similarities in the abstracted patterns and the known patterns. The source may be a user, a device, a computer program, and the like. A user interface may be provided through which the source can rate the quality of the remedial guide. The remedial guide may include reference to past errors made by the source.

A method of teaching may comprise abstracting an excerpt of text into patterns; comparing the abstracted patterns to known patterns to assess grammatical errors in the excerpt of text; using source mistakes in a particular document in order to teach grammar, wherein the teaching may be conveyed through presenting explanations including original text of source mistakes in explanations; and considering past source mistakes to assemble a writing reference guide customized for the source. The source may be a user, a device, a computer program, and the like. The writing guide may not reference a particular text. The writing guide content may be selected based on the source's specific writing problems. The source may be enabled to rate content within the guide.

A method of grammar checking may comprise performing an analysis on a body of text; abstracting the text into patterns and analyzing the grammatical construction of the text; assessing the quality of the text by comparing error rate to known error rates; and determining a quality of writing metric for the text. The source of the text may be from a web page on the Internet. The source of the text may be a search result. The known error rates may be in percentage terms. The known error rates may be in absolute terms. The body of text may be determined to be of a certain genre and the known error rates related to that genre. The body of text may be determined to be from a certain type of source and the known error rates relate to that type of source. The body of text may be determined to be from a certain type of source and the known error rates relate to that type of source. The determined quality may be used at least in part to filter search results. The determined quality may be used at least in part to rank search results. An alert may be sent based on the determined quality. The determined quality may be used as a threshold for accepting content for publications. The assessing may utilize at least one human proofreader. The utilization of the at least one human proofreader may be managed through algorithmic checking mechanisms. The quality of writing may be indicative of a category of text. The category may be junk email, user-generated content, text content not written well enough to be published text, and the like.

In embodiments, a method of grammar checking may comprise performing a grammatical analysis on a body of text; determining a quality of writing metric for the text based on the grammatical analysis; and manipulating search results based on the quality of writing metric. The source of the text may be a search result. The manipulation may be to filter search results, rank search results, and the like.

In embodiments, a system of grammar checking may comprising a grammar checking facility for inferring the quality of content in a text passage in order to differentiate the text passage from at least one category of text, wherein the text may be provided to the grammar checking facility, the grammar checking facility performs an analysis of the text for grammatical errors, the grammar checking facility searches for a match between the quality of content and that of the at least one category of text, and generates an alert of a match. The category may be junk email, user-generated content, and the like. The category may be text content not written well enough to be published text. The assessing may utilize at least one human proofreader. The utilization of the at least one human proofreader may be managed through algorithmic checking mechanisms.

In embodiments, a method of grammar checking may comprise providing a grammar checking facility to grammar check a body of text provided by a device in order to improve the grammatical correctness of the text; executing a process on the grammar checking facility, the process comprising: performing an analysis on the text; abstracting the text into patterns; analyzing the grammatical construction of the text based on the patterns; correcting grammatical errors in the text based on the analysis; enriching the text based on comparison of the abstracted patterns to known patterns; and providing the corrected and enriched text to the mobile device. The device may be a mobile communications device, a user, an intended recipient, and the like. A mobile communications device may be at least one of a mobile phone and a tablet computing device. The device may utilize character recognition. The device may utilize voice-to-text recognition. Formatting of the text may be to correcting text, improving the text, and the like. Specifics of the originating device may be taken into account in text corrections. Specifics of the originating device may be taken into account in text enrichment. The body of text may be at least one of a text message, an email, a micro-blog entry, a blog entry, and a social network entry. The body of text may be associated with a category of text. The category may be medical, and where the analyzing may be performed based on patterns in medical text. The medical text may be associated with a diagnostic procedure, with a prescription, and the like. The category may be legal, and where the analyzing may be performed based on patterns in legal text. The legal text may be a police report. The corrected text may be in the form of at least one of an email and plain text prose. The corrected text may be offered to the source in multiple transmission formats. The correcting may utilize at least one human proofreader. The utilization of the at least one human proofreader may be managed through algorithmic checking mechanisms.

In embodiments, a system of grammar checking may comprising a grammar checking facility integrated into a computing environment to analyze device generated text for grammatical errors, wherein a user generates a text input on the device, the device transmits the text input to the grammar checking facility, the grammar checking facility checks the text input for grammatical errors and generates a corrected text, and the grammar checking facility transmits the corrected text. The device may be a mobile communications device, an email client on a computer, and the like. The device may be at least one of a mobile phone and a tablet computing device. The error may be a grammatical error. The grammatical error may be a formatting error. The correction of the grammatical error may result in a text enhancement. The transmitting may be transmitting to the intended recipient, to the device, and the like. The user may select the corrected text for transmission. The input text may be a text message, an email, a micro-blog entry, a blog entry, a social network entry, and the like. The corrected text may be in the form of at least one of an email and plain text prose. The corrected text may be offered to the user in multiple transmission formats.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 11 depicts an embodiment summary report

FIG. 12 depicts an embodiment navigation tool.

FIG. 15 depicts an example of distinguishing text in the text editor.

FIG. 17 depicts another embodiment feedback card.

FIG. 19 depicts another embodiment feedback card.

FIG. 20 depicts an embodiment audit card.

FIG. 25 depicts an example listing of error classifications.

FIG. 26 depicts an example of a search result augmented with a writing rating indicator.

While the invention has been described in connection with certain preferred embodiments, other embodiments would be understood by one of ordinary skill in the art and are encompassed herein.

DETAILED DESCRIPTION

Figure 1:
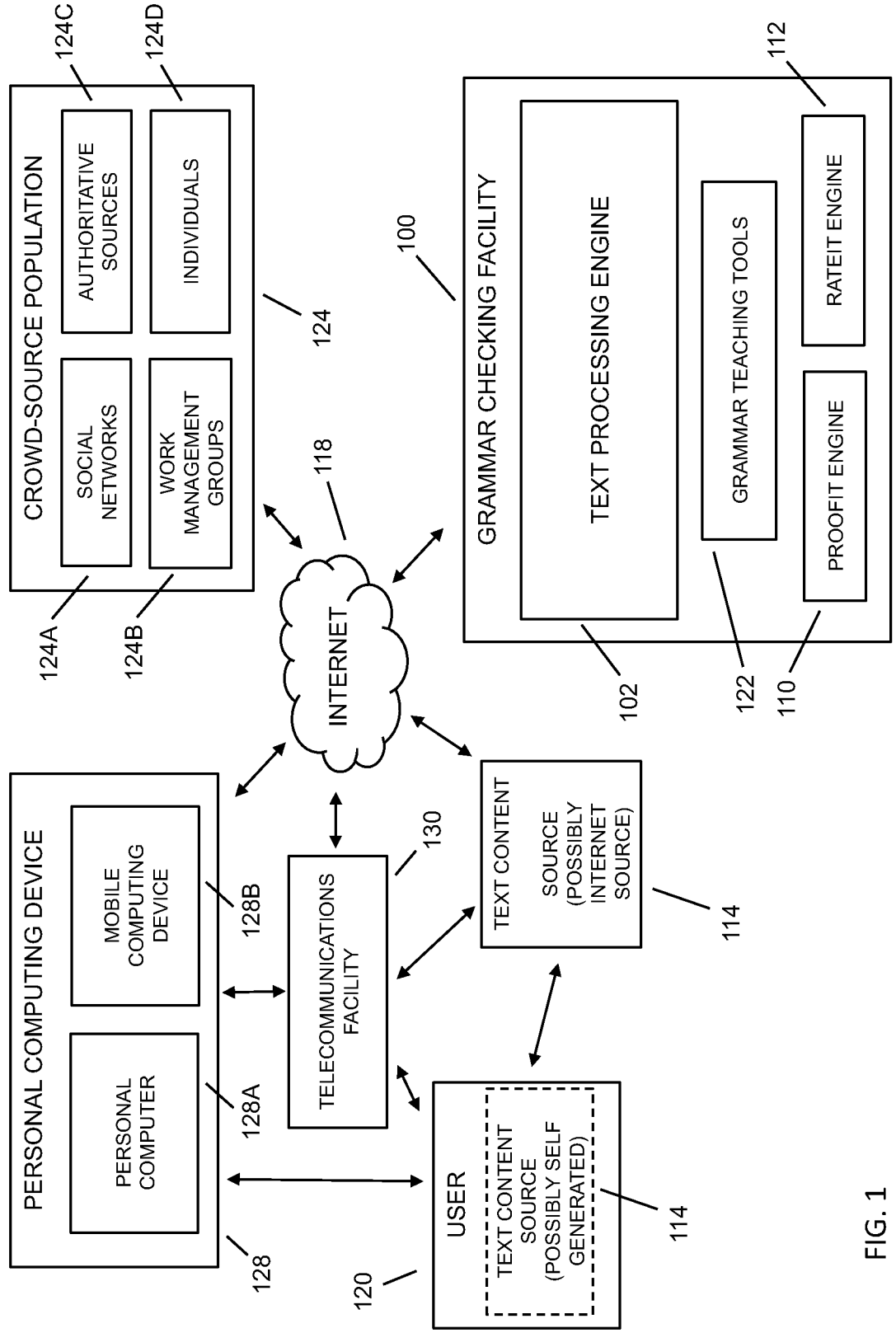
FIG. 1 depicts an embodiment block diagram of the facilities associated with the grammar checking facility.

Referring to FIG. 1, methods and systems may provide for a grammar checking facility 100 to improve the quality of computer-based grammar checking to a user 120 of a personal computing device 128, such as through a text processing engine 102, wherein the text processing engine 102 may be a software-based grammar checker. Text content sources 114 for grammar checking may include documents, text input, word processing generated documents, scanned source documents, books, magazines, email, SMS messages, and the like from the user, as well as from across the Internet 118, such as from searches, web pages, document storage sites, e-books, and the like. Text content 114 may be associated with a plurality of content generation environments, including academics, productivity tools, job searching, legal, healthcare, police reports, government, consumer support, customer reviews, search engine optimization professionals, marketing professionals, advertising professionals, call center support, post-translation quality control, language learning, dialect accommodation service, and the like. Text content 114A may be generated by the user 120, provided by the user but sourced through the Internet, provided directly to the grammar checking facility, and the like. The grammar checking facility may provide a user with grammar teaching tools 122 along with the grammar checking service in order to improve the user's writing skills, such as with reference feedback 'cards' that embed suggested improvements into the submitted text content. In embodiments, the grammar checking facility may provide for management of grammar checking through a crowd-source population 124, such as through work management groups 124B, social networks 124A, authoritative sources 124C, individuals 124D, and the like. The grammar checking facility may utilize methods of managing proofreaders in the crowd-source population to complement the grammar checking capabilities of the text processing engine, such as running text content through the text processing engine and then using a 'proofit' engine to manage further grammar checking through human proofreaders. The proofit engine may manage the human proofreaders in a manner such that the proofing of the text content takes a short period of time, such as through restricting the number of errors being delivered to a single human proofreader and sending multiple errors from the text content to multiple proofreaders in parallel. The grammar checking facility may provide grammar correction and/or text enrichment to a user of a personal computing device 128 with input limitations such as a small personal computer 128A, a mobile computing device 128B, a computing device with voice-to-text input, and the like, such as when emailing, texting, and the like, where a user may make mistakes more often if the user were working on a personal computer with a standard keyboard and display. The grammar checking facility may also be used to infer the quality of text content from an Internet source through a rateit engine, such as for text content from a website, from a search, and the like. In this way, the grammar checking facility may be used not only for improving the grammatical correctness of a user's text, but also as a check of the quality of other text content sources. In embodiments, the user 120 may communicate with the grammar checking facility 100 through the Internet 118, through a telecommunications facility 130 (such as a cell network), and the like.

Figure 1A:
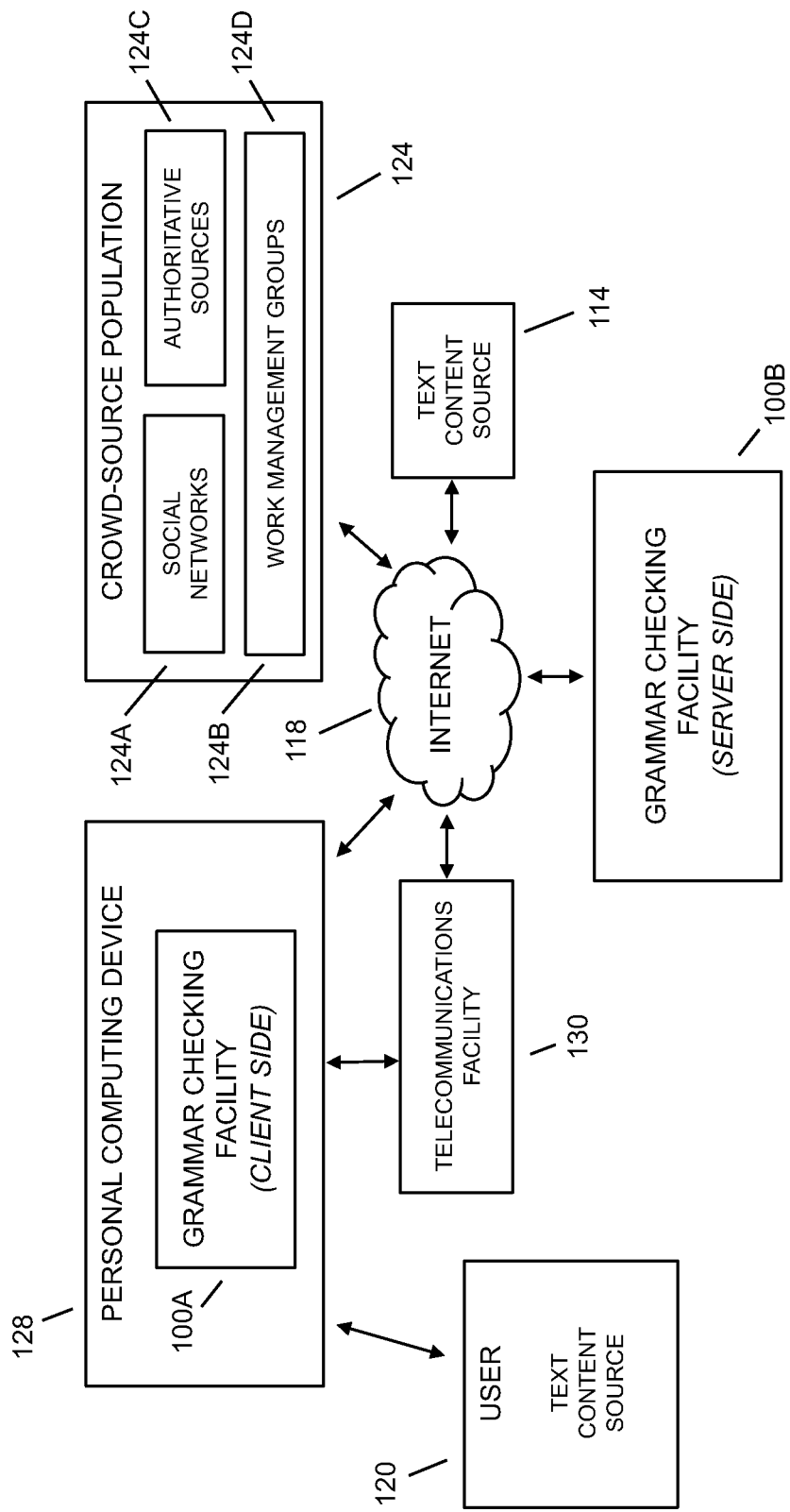
FIG. 1A depicts an embodiment block diagram of the facility associated with the grammar checking facility, where the grammar checking facility is implemented in a hybrid client-server configuration.

FIG. 1A depicts a hybrid processing configuration where at least a portion of the grammar checking facility 100B is located on the client side and the remaining portion of the grammar checking facility 100A is located on the server side, where one skilled in the art will appreciate the various combinations of client-server configurations and partitioning, including a configuration where the processing portion of grammar checking facility is located on the client side with possibly only administration, management, updates, and the like left on the server side (such as when technology advances to the point where processing, memory, and the like are available on the client device to accommodate the processing requirements of the grammar checking facility). In embodiments, the text being sent for correcting may be from any computer-based text application or management tool known to the art, including word processors, email, web-mail, personal information manager (such as Microsoft Outlook, and the like), mobile phone communications applications, such as email, texting, and the like. In embodiments, the service provided to users through the grammar checking facility may be made available through third-party applications, such as through an application programming interface (API), plug-in, and the like, including in association with a word processor, browser, search engine, email client, SMS application, blogging application, micro-blogging application, content management facility, publishing facility, advertisement facility, and the like.

Figure 2:
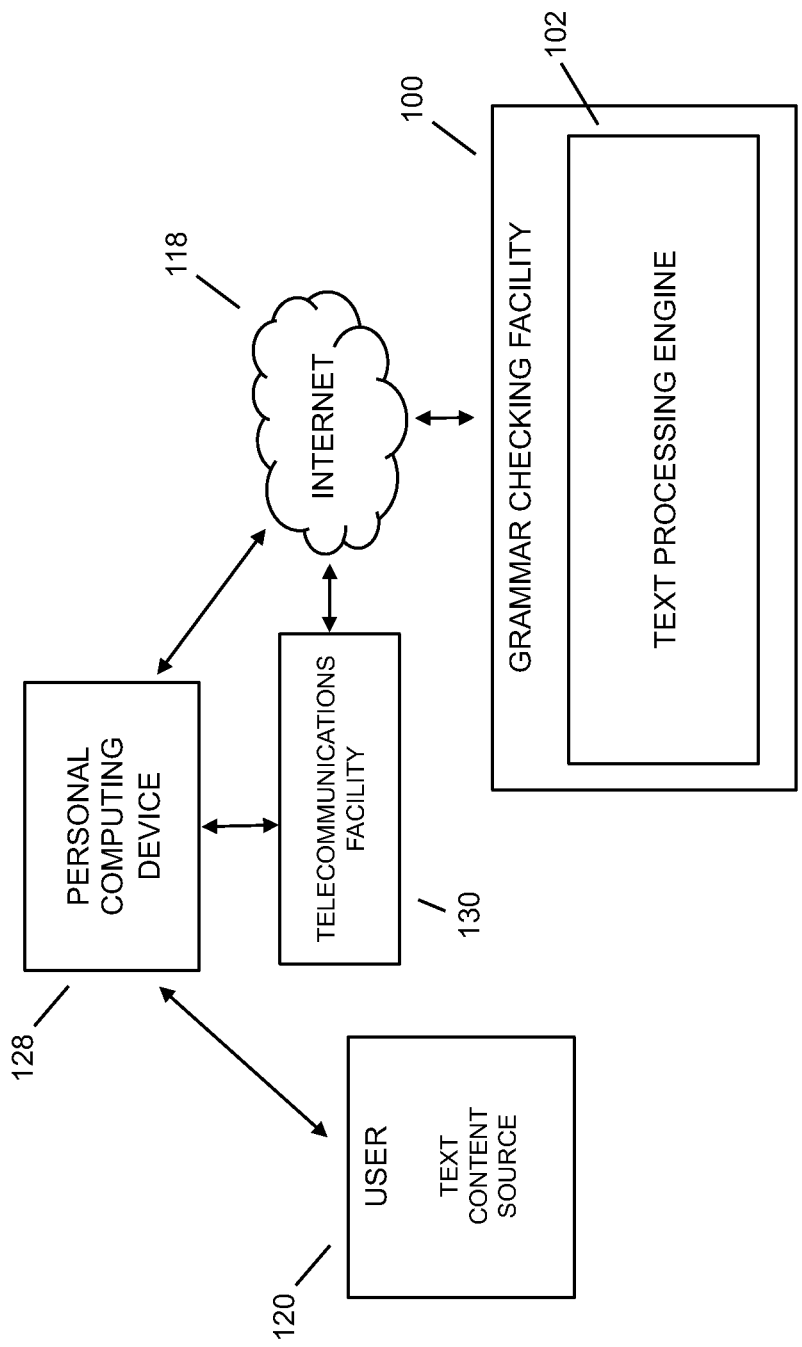
FIG. 2 depicts an embodiment block diagram of the text processing engine with interaction with a user.

Referring to FIG. 2, the grammar checking facility's 100 text processing engine 102 may provide a custom pattern description language as part of the implementation of the text processing engine in a concise and flexible method for matching parts of a sentence, such as represented as a tree model, phrase tree, and the like, which are understood by one skilled in the art, as a way to describe a given language's syntax through phrase-structure rules. They are used to break down a natural language sentence, such as from a user 120, from the Internet 118, and the like, into its constituent parts (also known as syntactic categories) namely phrasal categories and lexical categories (such as parts of speech, and the like). Phrasal categories include the noun phrase, verb phrase, prepositional phrase, and the like; lexical categories include noun, verb, adjective, adverb, and many others. The grammar checking facility's pattern description language may also provide a convenient way to bind variables to different parts of a given sentence in order to use such parts in explanations, such as with explanation templates, and/or perform transformations on them, such as for suggesting corrections. Examples of sentence parts that can be matched may include characters (such as parts of words, and the like), words, punctuation marks, syntactic categories, and the like, where syntactic categories may include lexical categories (such as parts of speech: noun, verb, preposition, and the like), phrasal categories (such as noun phrase, verb phrase, adverbial phrase, subordinate clause, and the like), or any combination or language patterns of the above. Sentences may be represented as phrase trees, but the grammar checking facility may also work with any flat (sequential) or tree model representations of sentences.

The text processing engine may take a tree model, sets of language patterns, control patterns, and the like, as input data. A syntax parser may provide the tree model of the original sentence, where the syntax parser as well as other components (such as parts of speech tagger, and the like) may be provided by a third-party. In embodiments, the tree structures utilized by the grammar checking facility may be custom or those known in the art, where a tree structure is a structural representation of a sentence in the form of an inverted tree, with each node of the tree labeled according to the phrasal constituent it represents. For example, a third-party parser may provide a facility for building trees, also referred to as 'syntax models'. Tags used in such a parser may include bracket labels, such as at a clause level, a phrase level, a word level; function tags, such as for form and function discrepancies, grammatical role, adverbials; and the like. For instance, bracket label at a clause level may include SINV, for an inverted declarative sentence, i.e. one in which the subject follows the tensed verb or modal. A bracket label at a word level may include JJS, for an adjective, superlative. A function tag in a grammatical role may include SBJ, a surface subject, which marks the structural surface subject of both matrix and embedded clauses, including those with null subjects. An adverbials function tag may include MNR, a manner, which marks adverbials that indicate manner, including instrument phrases. These tags are meant to be illustrative, and not limiting in anyway, but may represent tags as utilized by the grammar checking facility, and as known in the art. In embodiments, parentheses as used with tags may represent nesting, or branches in tree models (such as for parent-child relationships, and the like).

An example of a sentence and its model is as follows for the sentence "I definitely will do it":

```
I definitely will do it.
(TOP
  (S
    (NP
      (PRP I))
    (ADVP
      (RB definitely))
    (VP
      (MD will)
      (VP
        (VB do)
        (NP
          (PRP it))))
    (. .)))
```

A set of language patterns may be input to match the sentence against along with the corresponding transformation rules and explanation templates, and control parameters. The matching may also be associated with grouping by categories and points of grammar.

Output from the engine may include a set of issues (such as mistakes, and the like) found in the sentence with the IDs of the corresponding language patterns, location information (such as coordinates of mistakes, and the like), compiled explanations (such as featuring the original text where applicable, and the like), and corrections (if any).

The following presents a description of features with examples, where the examples are meant to be illustrative but not limiting in any way.

Expressions in the pattern description language of the text processing engine may consist of literals, operators, functions calls, declarations, transformations, explanation templates, and the like.

In embodiments, literals may denote particular sentence constituents. For example, VBZ may stand for any verb in present tense, 3rd person singular (such as "goes", and the like).

In embodiments, operators may denote sets and tree structures of constituents and their relations; wildcards, anchors, alternation, quantifiers and operations over these sets and tree structures.

In embodiments, function calls may allow introducing additional conditions for matching. For example, (NN canBe (VB)) may stand for a noun (NN) that can also be a verb (VB) in certain contexts (such as "fire", "run", and the like). Functions may implement other necessary calculations and checks over sentence constituents that basic language operators do not provide.

In embodiments, declarations and uses of references may represent particular sentence constituents, where references may have various applications, such as naming and substituting some part of a language pattern to make the notation more compact and readable; extracting and storing the corresponding sentence fragment in memory for future use in explanations and corrections; defining the boundaries of mistakes in a sentence; and the like.

In embodiments, transformations may be used to describe the rules for generating corrections, such as with a pattern portion and a transformation portion. For example, a pattern portion may include a language pattern that matches sentences like "I like to going (swimming, running)", and the like. When this language pattern matches a sentence, one of the variables, such as $GERUND will contain the actual verb from the sentence (such as "going", and the like). Then, the text processing engine can use this verb to suggest a correction. In order to do this, for this particular language pattern, a transformation rule may suggest using a base form of the verb instead of the '-ing' form $GERUND=to(VB, $GERUND)//expression that calls the function that transforms the '-ing' verb ($GERUND on the right) into its base form (VB). The output for "going" will be "go".

In embodiments, explanation templates may also contain references declared in the corresponding language patterns. In the explanations displayed to users, the text processing engine replaces these references with the actual words from the original sentence. An explanation portion may be associated with a pattern section. For example, a pattern section may match sentences like "I definitely will do it." and have two references for the adverb and the modal verb, such as $ADVP and $MODAL. An explanation portion may be The adverb "$ADVP" should go after the modal verb "$MODAL", not in front of it. For the example sentence above, the explanation card will say: "The adverb "definitely" should go after the modal verb "will", not in front of it."

In embodiments, the grammar checking facility may utilize pattern matching to match sentences against patterns, where pattern matching is the act of checking some sequence of tokens for the presence of some pattern of constituents, and where tree patterns may be used as a general tool to process data based on its structure. The grammar checking facility may use language pattern matching on phrase structure trees for mistake detection. Patterns may depend on the parser used, because they do not describe the language patterns in the actual sentence models but the language patterns in the models built by the parser. So, depending on the parser, different language patterns may be generated for the same error.

Not all mistake patterns have corresponding correction patterns (i.e. transformations). The grammar checking facility may not be able to suggest corrections in some cases, where only a human proofreader may be able to identify a correction, such as described herein. The relationship between language patterns and transformations may be one-to-zero, one-to-one or one-to-many. In embodiments, transformations may not be shared or reused between multiple patterns, but the functions used in transformations (e.g., "convert word X to form Y") may be shared. In embodiments, it may be possible to have an implementation that shares certain transformations between several patterns if they require the same kind of correction.

In embodiments, the computing infrastructure for the grammar checking facility may be a multi-server configuration. For instance, language pattern matching may require a great deal of computing resources and thus may be performed in the cloud (such as on remotely-located servers connected via the Internet, instead of users' computers, and the like). To serve a large number of users, the grammar checking facility may run on a cluster consisting of multiple processing nodes. Nodes may be virtual or physical servers, with the virtual server approach providing greater flexibility. In embodiments, the computing configuration may be a server, a multi-server, a multi-server with load balancing, a distributed system, a dedicated server cluster, a self-hosted system, a collocated system, and the like.

The grammar checking facility may provide for customized grammar teaching, such as though grammar teaching tools as described herein. One or more grammatical rules may be applied to text to prepare customized feedback for a user. The grammar checking facility may enable a user to provide text that is analyzed and compared to the grammatical rules. The grammatical rules to be applied may be defined based on a genre selected by the user. The use of a genre to apply grammatical rules may enable the grammar checking facility to use the context of the text to more accurately make suggestions to the user than methods and systems in the prior art.

The grammar checking facility may provide the user with customized feedback. The invention may synthesize customized feedback that includes both a general grammatical rule and actual text provided by the user that is relevant to the rule. The actual text may be embedded within the general rule so as to fully enable a user to understand grammatical errors existing in the user-provided text. The customized feedback may enable actual text from the user-provided text to be presented along with otherwise generic reference content to more effectively teach grammatical rules to the user. The user text used in the explanation may be the text that constitutes the mistake, and inserted in such a way that it is clear to the user which parts of the sentence are incorrect and why. The customized feedback presented to the user may include further examples of exact matches to the detected error. The customized feedback may enable the user to gain a better understanding and memorization of writing principles. By optionally not offering suggestions for corrected sentences, the feedback cards may serve as a call for the user to revise sentences by utilizing appropriate grammar rules that are explained in the cards. This may enable more engaging learning than in the prior art.

In an aspect of the invention, a voting system may also be provided for increasing quality or perceived quality of feedback to the user. For example, users may vote on the quality of reference material offered in feedback cards. The grammar checking facility may give users an opportunity to participate in improving the quality of feedback, which they may do by voting up and down specific reference cards. If a user is dissatisfied with the quality of material in a feedback card (such as the explanation not being sufficient, and the like), they may vote this card down. After a vote down button is pressed, the grammar checking facility may record the sentence for which the card was generated and cross-match it with the reference card in which the vote down button was clicked. The grammar checking facility may ask the user what specifically they didn't like about the card (such as quality of explanation, length of explanation, relevance of explanation to the mistake in question, and the like). User feedback (in this example, the number of vote ups and downs) may be analyzed by a quality assurance facility to determine how to improve content in feedback cards and ease of comprehension by users. In embodiments, the voting system may be applied to any feedback, content, corrections, and the like that is provided to the user. For instance, the user may be able to vote on individual corrections implemented or suggested in a body of text, allowing the user to not only control what corrections are applied, but also providing feedback to the grammar checking facility in order to improve the grammar checking process.

In embodiments, the grammar checking facility may be provided as a hosted web-accessible system, provided for example as a software as a service (SaaS) implementation. It should be understood that the grammar checking facility could also be provided as an installed program on a computer, a plug-in or API for an existing word processor, or other implementations providing substantially the same advantages as the present invention.

Figure 3:
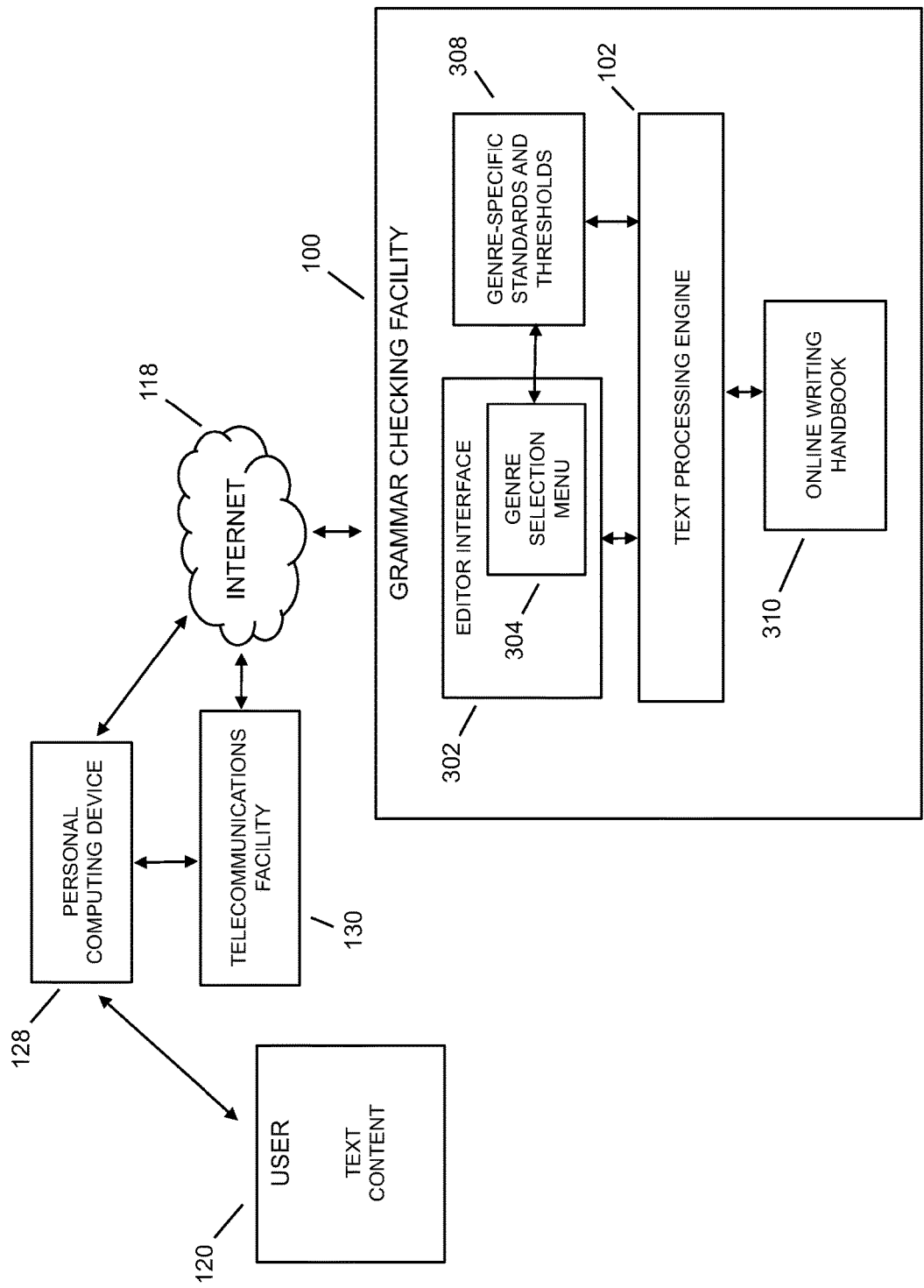
FIG. 3 depicts an embodiment block diagram of the text processing engine with automated teaching facilities.

Referring to FIG. 3, an embodiment functional diagram of the grammar checking facility 100 is depicted. As shown, a user 120 may provide text content to the grammar checking facility 100, such as in association with a personal computing device 128, and through the Internet 118, through a telecommunications facility 130 (such as cell phone network, and the like) and across the Internet 118, and the like. The grammar checking facility 100 may include a text processing engine 102, an editor interface 302, an online writing handbook 310, a database of language patterns and rules 314, genre-specific standards and thresholds 308 such as interfaced to an editor genre selection menu 304, and the like.

Figure 4:
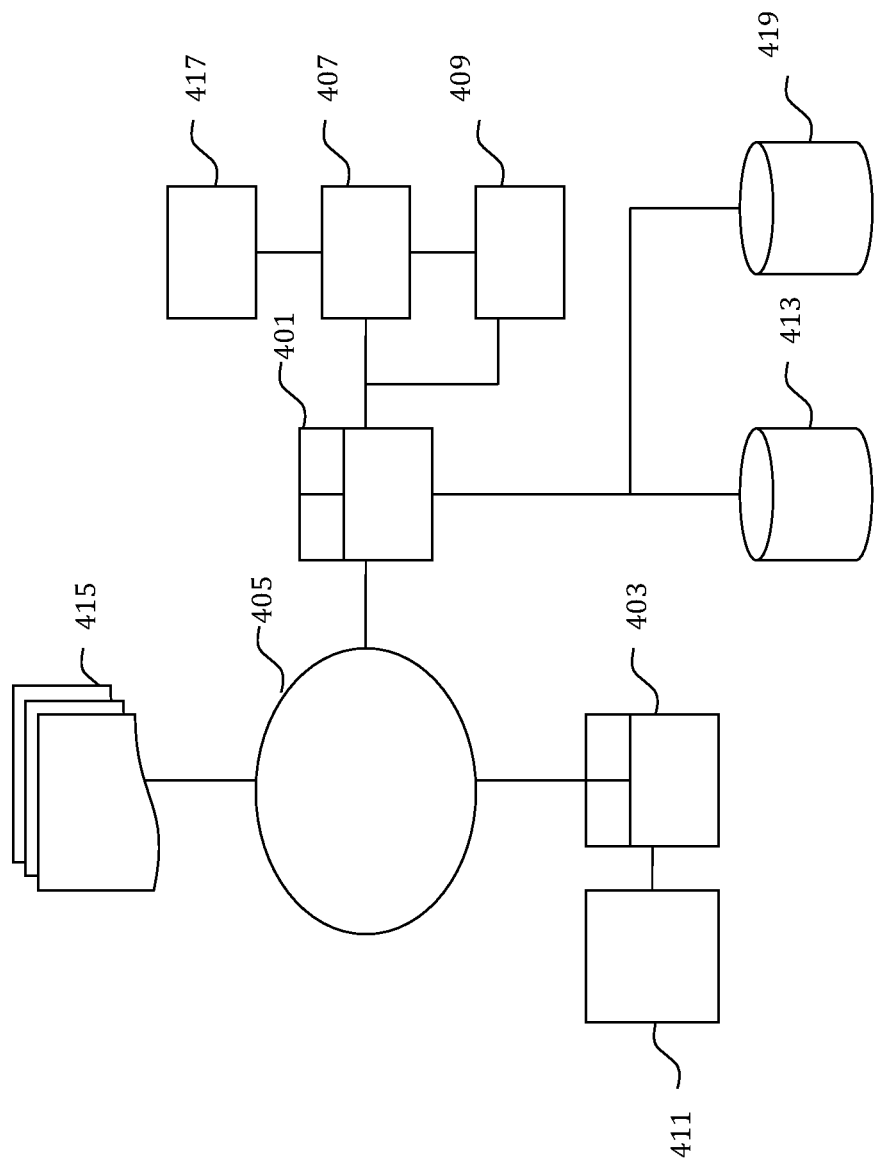
FIG. 4 depicts an embodiment functional block diagram of the text processing engine with automated teaching facilities.

Referring to FIG. 4, an embodiment physical diagram, showing components as they may be provided in the system is depicted. As shown, the grammar checking facility may include a network-accessible server computer 401 and a network-connected client computer 403. The client computer may access the server computer by means of a network (5) such as the Internet.

The server computer may include or is linked to a text processing engine 407 and a user interface utility 409. The text processing engine may include or be linked to a part-of-speech tagging utility 417. The user interface utility may enable a user to provide text to the text processing engine and receive feedback from the text processing engine. The user interface utility may implement a web-based interface accessible via a web browser 411 provided by or linked to the client computer. The server computer may also include or is linked to a database 413 of one or more grammatical rules and a genre database 419 for selecting appropriate grammatical rules. For each grammatical rule, the database may include a fillable plain-language explanation for relating the rule to a user. The fillable aspect of the explanation can be filled (i.e. completed) with words, sentences, or other text portions selected from the user-provided text. For each grammatical rule, the database may include generic reference content, which may be additional generic feedback content relating to the rule and one or more links to further information regarding the rule. The text processing engine may also be linked by the network 405 to one or more external references sources 415.

The grammatical rules may include grammatical criteria and/or patterns including sentence-level and word-level criteria and/or language patterns. The grammatical rules to be applied to the text may be genre-dependent such that the grammatical rules to be applied, or the ways in which the grammatical rules are applied, may differ based on the selected genre. For example, configurable parameters may be provided for each of the grammatical rules and each grammatical rule may be selectively enabled or disabled based on the selected genre.

The user interface utility may enable the user to select the genre to apply to the provided text. For example, a drop-down menu could be provided for listing the available genres and selecting the appropriate genre. Genres may include both academic and non-academic genres, with some being discipline specific (for example, a science lab report). Examples of genres include, for example, academic essay, report, book review, research paper, dissertation, presentation, blog or news post, business document, newspaper article, press release, and the like.

After the genre-specific adjustments are applied to the default grammar checking algorithm, the text may be processed with the resulting adjusted algorithm.

Examples of grammatical rules include, for example, use of articles, use of conjunctions, use of nouns, incorrect use of numbers, incorrect use of prepositions, pronoun agreement, use of adjectives and adverbs, comparisons of two or more articles, faulty parallelism, confusing modifiers, incorrect use of negatives, use of qualifiers and quantifiers, subject and verb agreement, verb form use, punctuation within a sentence, closing punctuation, sentence structure, wordiness, passive voice use, commonly confused words, writing style, vocabulary use, and the like. One or more of these rules may be genre-dependent. Optionally, the user interface may enable the user to select which of the grammatical rules to apply to the provided text.

Selection of a particular genre by the user may initiate a request to the genre database to apply genre rules to the grammatical rules. The genre database may provide a set of genre rules that can be applied to the selection and application of grammatical rules. For example, selection of a particular genre may enable (activate) particular grammatical rules, disable (deactivate) other grammatical rules, configure thresholds in the grammatical rules (for example, a different number of words in a sentence or phrase may trigger "wordiness" warning for different genres), configure the style of comments for certain genres (for example, a comment worded as a strict requirement for a formal document may be worded less assertively, for example as a recommendation, for a more casual genre).

The text processing engine may be operable to analyze user-provided text and compare the text to the grammatical rules to be applied. It may then flag each sentence having a sentence-level error and each word having a word-level error.

For example, the text processing engine may parse the user-provided text, apply the parsed text to the grammatical rules and synthesize feedback for the user.

For example, the text processing engine may first parse the user-provided text and divide it into units, such as paragraphs, sentences, phrases and/or words, using standard language conventions for parsing, such as punctuation, line breaks and spaces. The paragraph, sentence, phrase and/or word units may then be parsed by a part-of-speech tagging utility of the text processing engine, and each word unit may be assigned a part-of-speech tag, corresponding to the part of speech it represents (such as, subject, object, and the like). The part-of-speech tagging utility may implement any of a number of known part-of-speech tagging algorithms such as the Viterbi™ algorithm, the Brill™ tagger algorithm, the Baum-Welch™ algorithm or others. The part-of-speech tagging utility may provide a set of tags (such as numeric, alphabetical, binary, and the like) indicating part of speech for each word.

The text processing engine may then match each paragraph, sentence, phrase and/or word to all enabled grammatical rules, as configured based on the selected genre. The grammatical rules may be of the paragraph, sentence, phrase or word level and may include units corresponding to one or more of the following, for example: a specific word or sequence of words (such as "go", and the like), a word from a set of words or sequence of words from a set of sequences (such as "go, move or proceed", and the like) or any word; a specific part of speech (such as "subject", and the like), a part of speech from a set of parts of speech (such as "direct object or indirect object", and the like) or any part of speech; a specific punctuation mark, a punctuation mark from a set of punctuation marks, or any punctuation mark; a phrase of a specific length (such as any 3 words, and the like) or a phrase with the length within the specific range (such as between 1 and 4 words, and the like) or a phrase of any length; and the like. The units may also be combined in more complex patterns by standard logic operators, such as "AND", "OR" and others. Each of the grammatical rules may also include generic reference content and a fillable plain-language explanation, to be used for providing feedback to the user.

Some grammatical rules may include priority or frequency tags to indicate that corresponding grammatical errors are more likely to occur in language and therefore may have higher priority (take precedence over other mistakes) or and particular mistakes are more frequent in language in general and therefore may have higher priority. When a particular paragraph, sentence, phrase or word includes more than one grammatical error, a grammatical rule with a higher priority or frequency tag may be selected (for example, if a "sentence fragment" mistake is detected, other sentence-structure mistake patterns may be irrelevant, so "sentence fragment" may take priority).

Once a grammatical error is matched to a grammatical rule, the actual text may be embedded in the corresponding fillable plain-language explanation. The feedback may also include generic feedback content. The feedback may also include a title (such as the name of the grammatical rule, and the like). The customized message may be synthesized by the text processing engine by inserting portions of user-provided text into the fillable plain-language explanation for the rule so as to fully enable a user to understand grammatical problems existing in the user-provided text. For example, in the context of a sentence-level error, those words causing the error may be isolated and placed into the fillable plain-language explanation, so as to draw the user's attention to the particular reasons that a grammatical error exists. The generic feedback content may include a narrative regarding the rule. It may include a list of one or more typical reasons the rule is not complied with and one or more example sentences that, while not selected from the user-provided text, are matches to the error in the user-provided text that illustrate grammatically incorrect and correct sentences related to the rule. Based on the customized message and/or the generic feedback content, the user may then address precisely the words causing the error in order to fix the error. Furthermore, the errors flagged by the text processing errors may be grouped into categories, enabling the user interface to summarize the results to the user as a summary report or scorecard, illustrating for example the number of occurrences within the text of each of the grammatical rules. This scorecard may assist the user in understanding grammatical errors that are common in the user's writing, enabling the user to focus on learning how to prevent those errors from arising in the future. In cases where the correction to the sentence may be made easily, the customized message may provide the user with one or more suggestions for correcting the error. Particular examples include word-level mistakes such as commonly confused words and overused words.

The customized message may also provide to the user the links to further information regarding the rule. The user may access these links for more detailed teaching on learning the rule.

The text processing engine may also be linked to one or more external reference sources (15). The external reference sources may be linked via the network. The text processing engine may compare passages of the user-provided text with the one or more external reference sources to detect and warn the user of possible plagiarism in the user-provided text. The text processing engine may obtain information from the external reference source that enables it to generate proper formatted citations in one or more formats. The text processing engine may include the citation in the customized feedback to enable the user to properly cite the reference. Text processing engine may implement any known text matching algorithm to determine which parts of text match external sources, for example a Rabin-Karp™ string search algorithm can be implemented. The text matching algorithm may return any text strings that match external documents and the URL's or other identifiers of those external documents.

Figure 5:
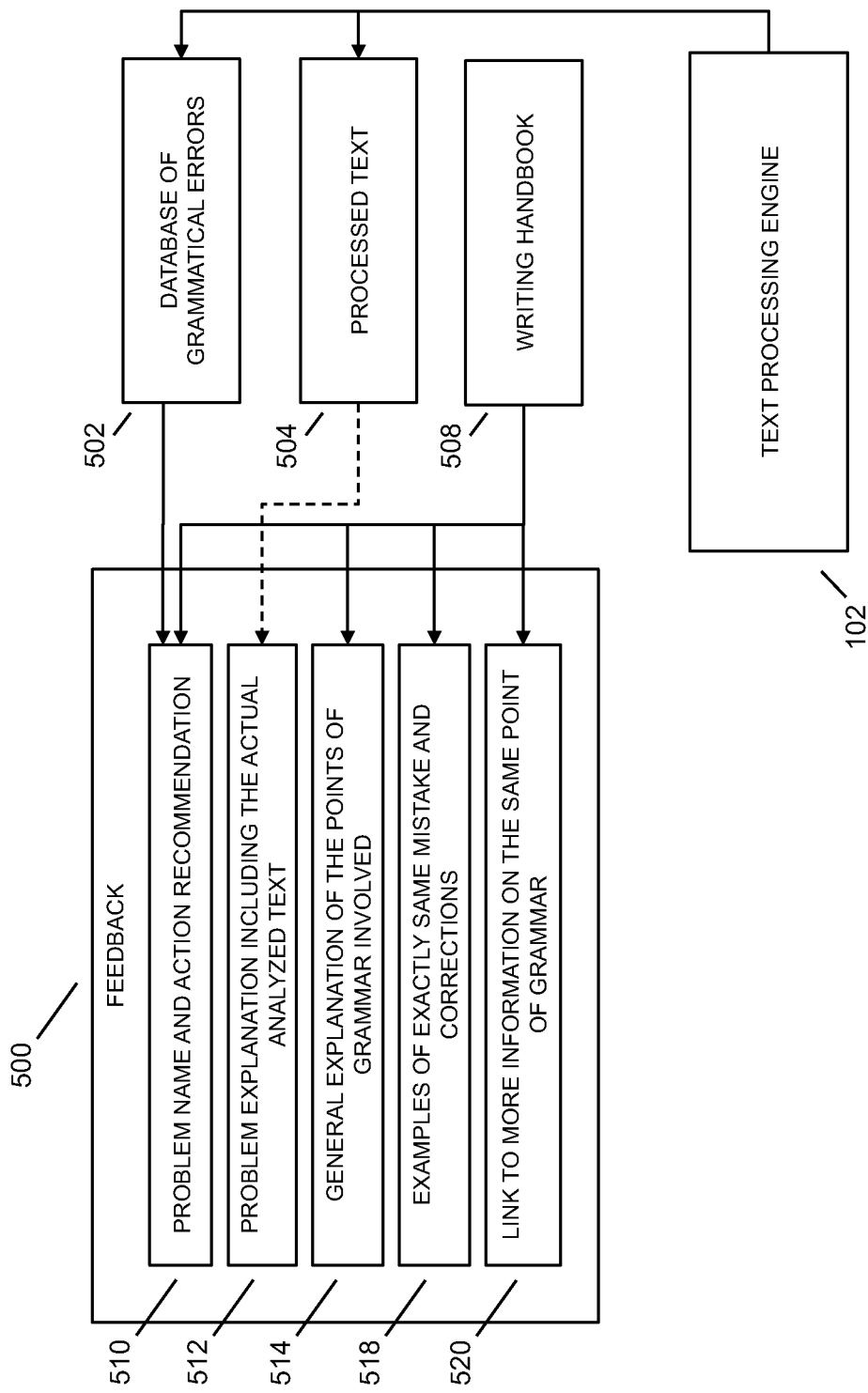
FIG. 5 depicts an embodiment process flow for feedback.

Referring to FIG. 5, feedback 500 may be developed in association with a database of grammatical patterns 502, processed text 504, a writing handbook 508, and the like, such as in association with the text processing engine 102 to form a plurality of different feedback forms, such as a problem name and action recommendation 510, a problem explanation including the actual analyzed text 512, a general explanation of the points of grammar involved 514, examples of exactly the same mistake and corrections 518, a link to more information on the same point of grammar 520, and the like.

Figure 6:
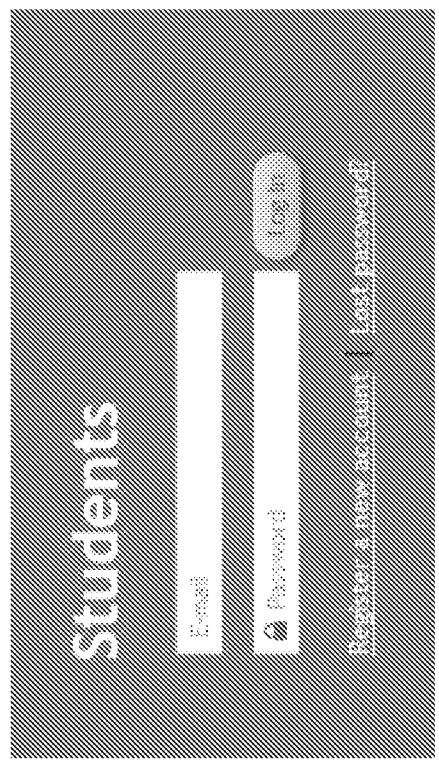
FIG. 6 depicts an embodiment login screen

In embodiments, the grammar checking facility may be used in a number of learning and professional scenarios, including, students improving their writing skills, language-learners and ESL/EFL students improving understanding of English grammar, professionals improving quality of their written work, writers using the grammar checking facility to correct bad writing habits and improve the quality of their writing in general, anyone who switches from one writing genre or context to another, usually more formal or rigorous, writing content or genre, such as from personal emails to professional emails end memos, and the like. For instance, the user may sign in and upload text, select a writing genre, and start the review through the grammar checking facility and wait for the report to be generated and sent back to them. The user may then browse through feedback categories, review feedback 'cards' (as described herein), and the like. FIG. 6 depicts an embodiment sign-in screen, such as using a username, password, and the like.

Figure 7:
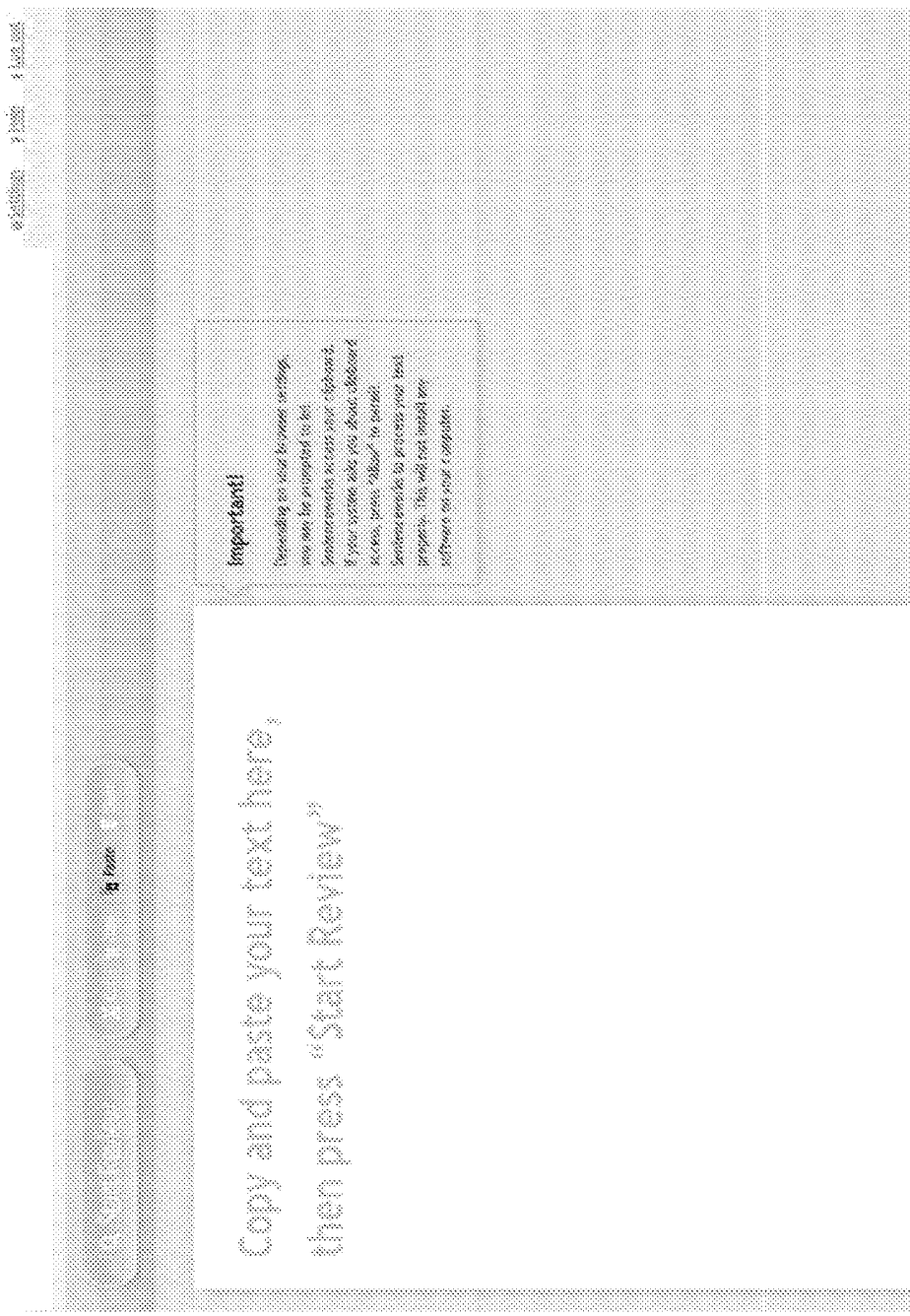
FIG. 7 depicts an embodiment text editor.

After successful sign in, users may be redirected to a text editor for text upload, such as shown in FIG. 7. Available options of uploading text to the grammar checking facility may be pasting the text into the editor through "Ctrl-V" function, by clicking "Paste" in editor toolbar, by typing text in the editor; by performing file uploads (such as .doc, .pdf, and the like), by submitting text directly from popular text editors like (such as Microsoft Word, Google Docs, and the like).

Figure 8:
FIG. 8 depicts an embodiment genre selection tool.

Once the text has been pasted into the grammar checking facility editor, a user may be given an option to select a writing genre that best matches the text in the editor, such as shown in FIG. 8. Writing genres may be both academic and non-academic, with some genres being discipline-specific (such as a science lab report, and the like). Selection of a genre may set standards and thresholds employed for analysis by a text analysis unit, so different evaluation standards may be applied for texts of different genres. Also, genre selection may influence selection of content for feedback, providing more fitting and targeted feedback for each genre.

Figure 9:
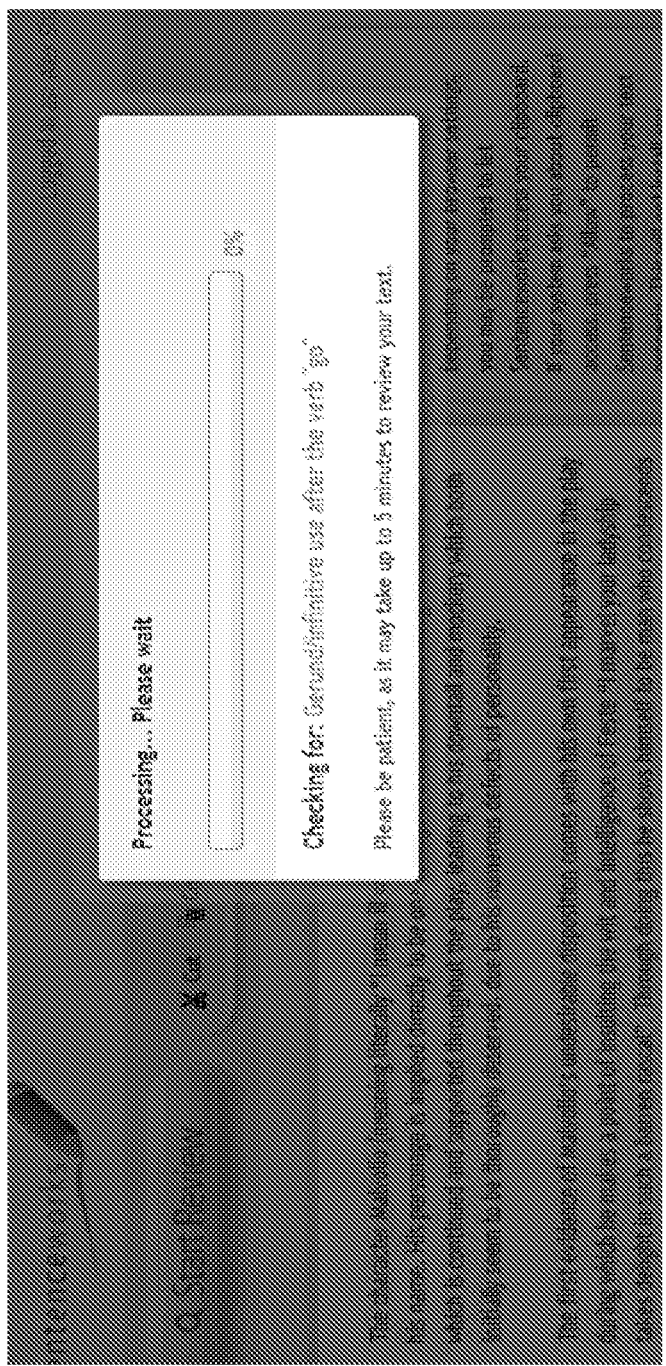
FIG. 9 depicts an embodiment process indicator.
Figure 10:
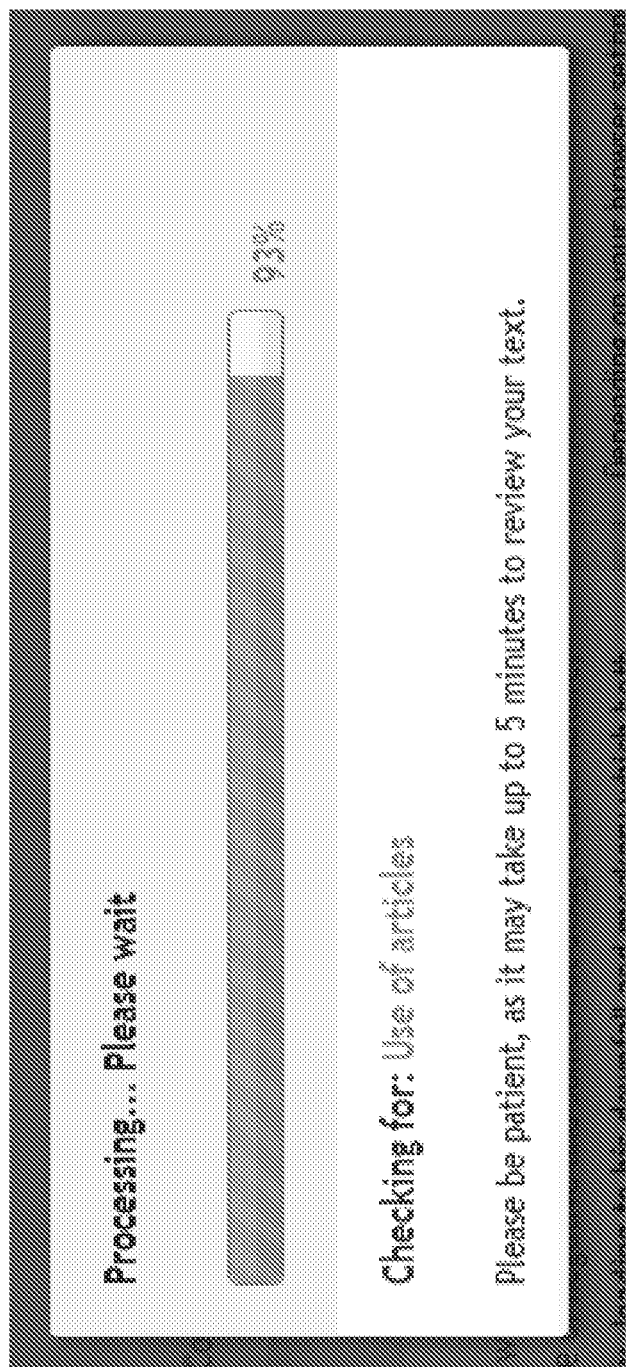
FIG. 10 depicts a second embodiment process indicator.

In embodiments, clicking a "Start Review" button may initiate review of text in the editor. Depending on the length of the document being checked, the review process may take different periods of time, such as one second, 5 seconds, 30 seconds, one minute, five minutes, ten minutes, and the like. Progress may be shown to the user on a progress bar, together with percentage of task completed, such as shown in FIG. 9. The user may also be shown what specific point of grammar their text is evaluated against on every stage of the review process, such as shown in FIG. 10. During the review process, the text may be sent from the editor window to the text processing engine, and analyzed according to a predefined set of criteria and patterns, which may take into account adjustments made by genre selection, as described herein. At the end of the review, the text processing engine may flag sentences with potential sentence-level errors and words with word-level issues. The reported errors may be grouped into categories for convenient navigation and presented to users as a summary report, such as shown in FIG. 11.

Figure 12:
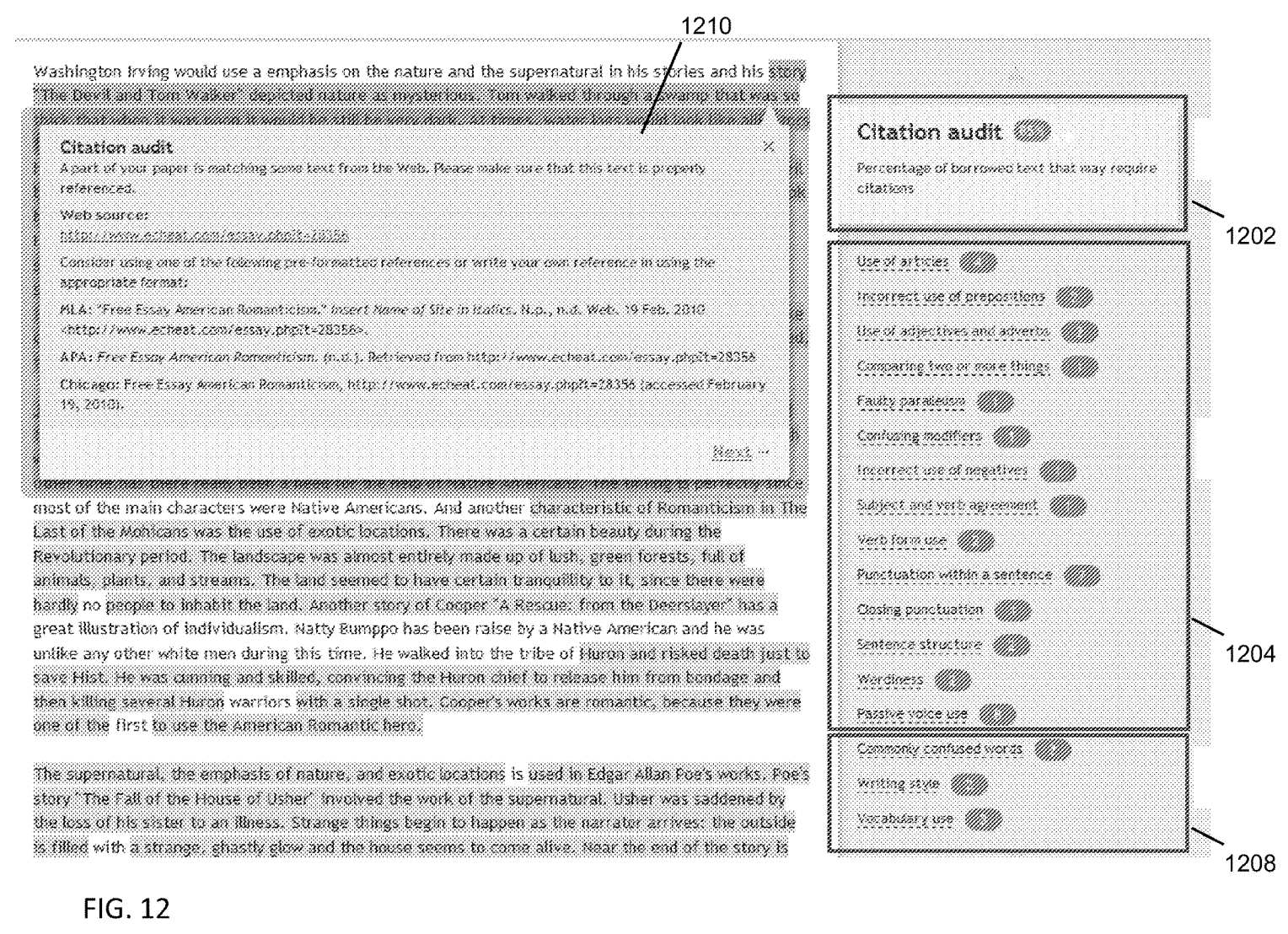
Figure 13:
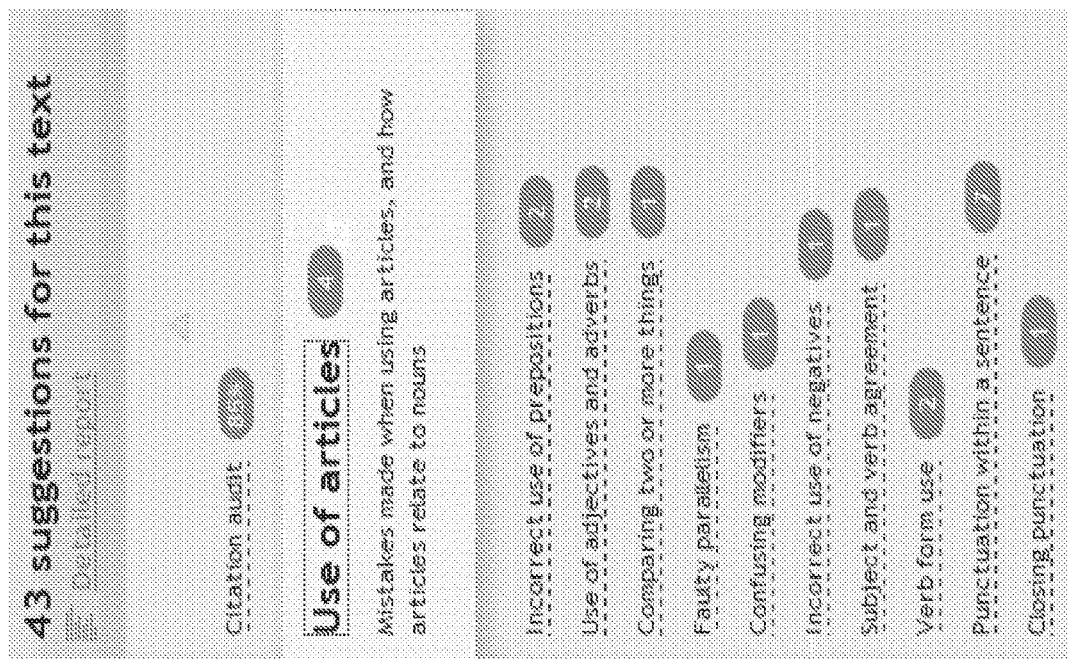
FIG. 13 depicts a close-up view of an embodiment navigation tool.

In embodiments, the user may review report results. For instance, after closing the summary report overview, users may return to the main editor window and navigate the results of text processing feedback categories, such as in sidebar links on the right margin of the editor as shown in FIG. 12. Feedback categories may be organized as a citation audit 1202, 1210, which may be the default category view once a report is generated; sentence-level feedback 1204, showing sentence-level mistakes, such as grammar and punctuation issues; word-level feedback 1208, showing word-level mistakes, such commonly confused words and vocabulary use issues; and the like. In an example, FIG. 13 shows feedback instances (possible mistake instances) for each feedback category. Clicking on feedback category may open a feedback card on top of text in the editor, together with the content of the card, as described herein.

Figure 14:
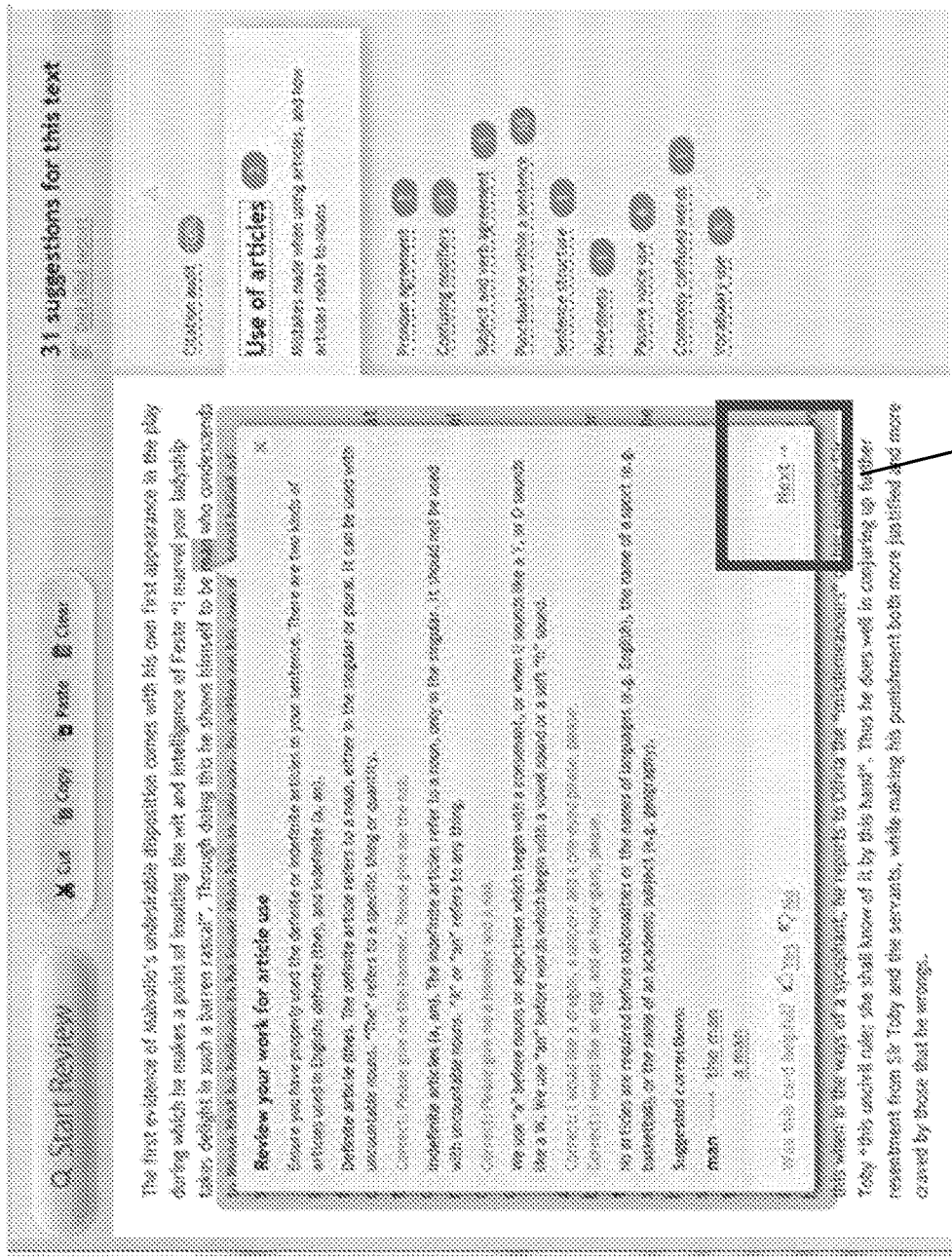
FIG. 14 depicts an example of a feedback card overlaying text

In embodiments, users may choose between going through the grammar checking facility's feedback, such as in a wizard-like fashion by clicking the 'next' button 1402 on each feedback card as shown in FIG. 14, or jumping to a category of interest by clicking on the corresponding tab on the right margin of the editor. Each category may have one or more feedback cards. Clicking on 'next' link, may open a subsequent feedback card in the same feedback category, if available, or send the user to the next feedback category. Clicking on a feedback category tab may open a feedback card for the first sentence/word in the text with the corresponding issues (such as clicking on 'use of articles' opening the feedback card for the first issue related to use of articles in the text being reviewed, and the like).

Figure 15:
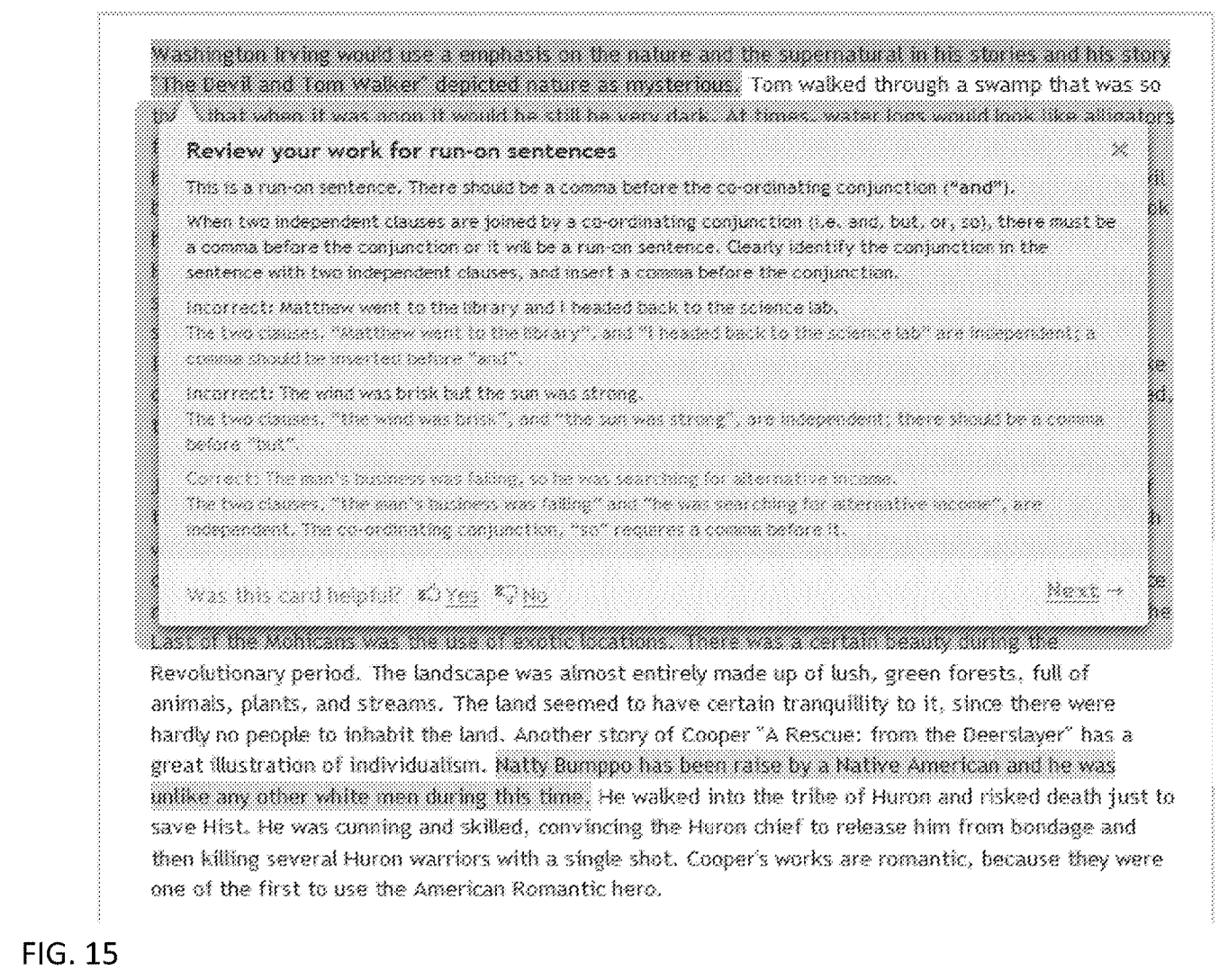

Feedback on detected writing issues may be provided via feedback cards. Feedback cards may overlay text in the editor, such as with an arrow pointing at the sentence and/or word that triggered the feedback card. Sentences and words for which feedback is available may be highlighted, such as shown in the editor as depicted in FIG. 15. To navigate between feedback cards in a sequence, the user may click 'next', click on any sentence or word highlighted in red, and the like.

Format and content of feedback cards may be generated based on depending on text being reviewed, mistake type, writing genre selected, and the like.

Each feedback card may be organized in such a way that learning value of each feedback instance is maximized. Depending on a mistake type, feedback cards may offer customized reference content that incorporates users' own text to better explain related grammar rule, usage examples, replacement suggestions, and the like.

Figure 16:
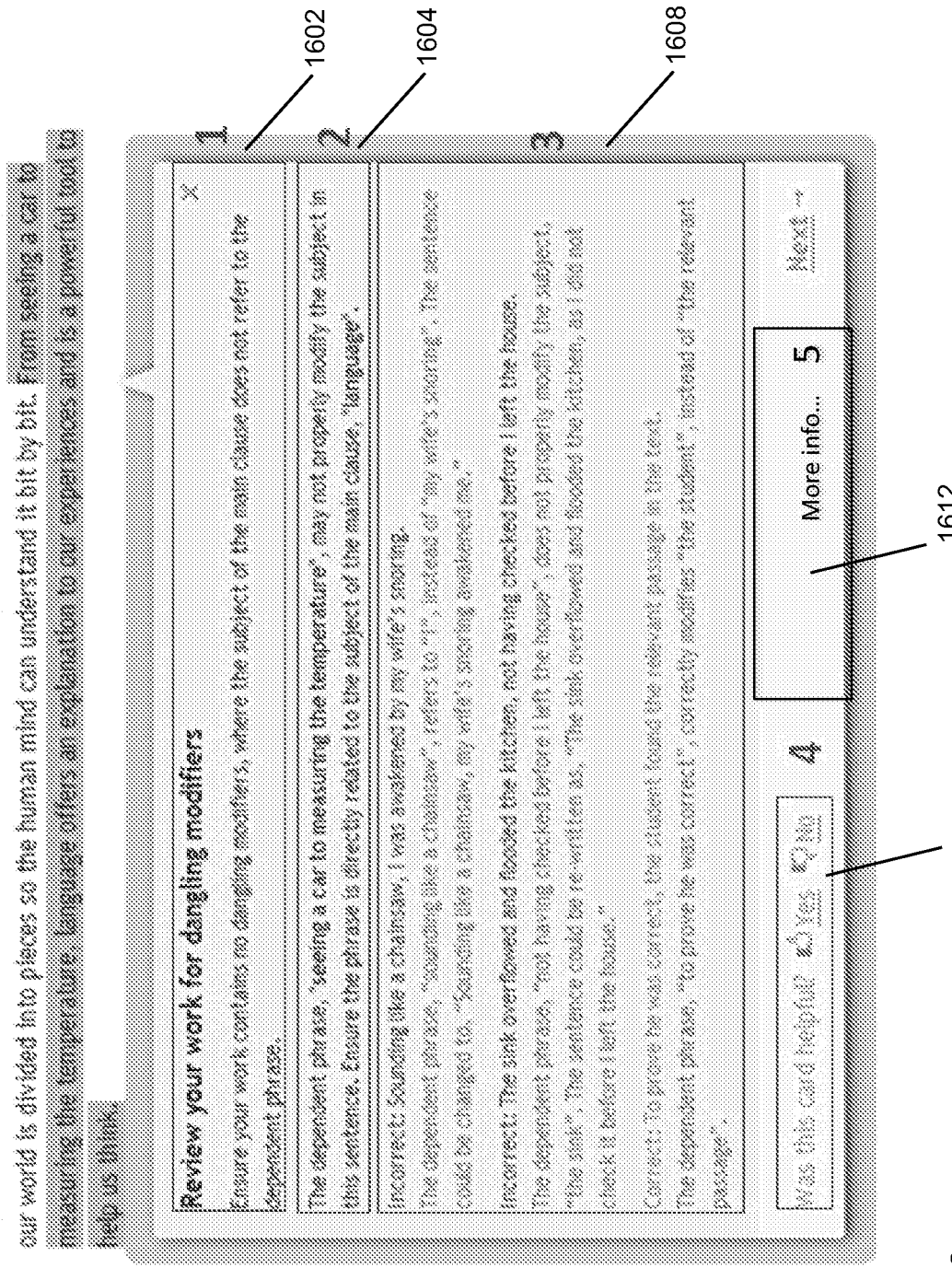
FIG. 16 depicts an embodiment feedback card.

FIG. 16 shows an example representation of a card, where in this in this instance is related to a sentence-level mistake, and where a user is presented with a number of elements generated by the text processing engine based on processed text, detected issue, and selected writing genre:

1. A title 1602, naming the detected issue and recommending optimal course of action.
2. Explanation of the issue 1604, synthesized by the text processing engine and including the actual text from the reviewed document to explain the relevant point of grammar allowing for better grasp of instructional content.
3. Examples of the sentences 1608 with the exactly same issue, including explanations on how this issue was corrected in each of the cases.
4. Vote buttons 1610 for quality assurance.
5. Link leading to more information 1612 on the subject in an online writing handbook.

In embodiments, the content presentation in a card may provide actual text from the reviewed document embedded into otherwise generic reference content to more effectively teach the writing rule. Examples presented to the user may be an exact match to the mistake detected in user's text in terms of the type of writing issue. This approach may ensure a better understanding and memorization of writing principles. Note that these cards may offer no correction suggestion options and only serve as a call to revise sentences by utilizing appropriate grammar rules that are explained in the cards.

In embodiments, the 'More info . . . ' link may be dynamically adjusted to lead the user to a relevant chapter, section, and even place on the page in an online handbook to further the learning effect of the feedback card in case the user needs additional help.

Figure 17:
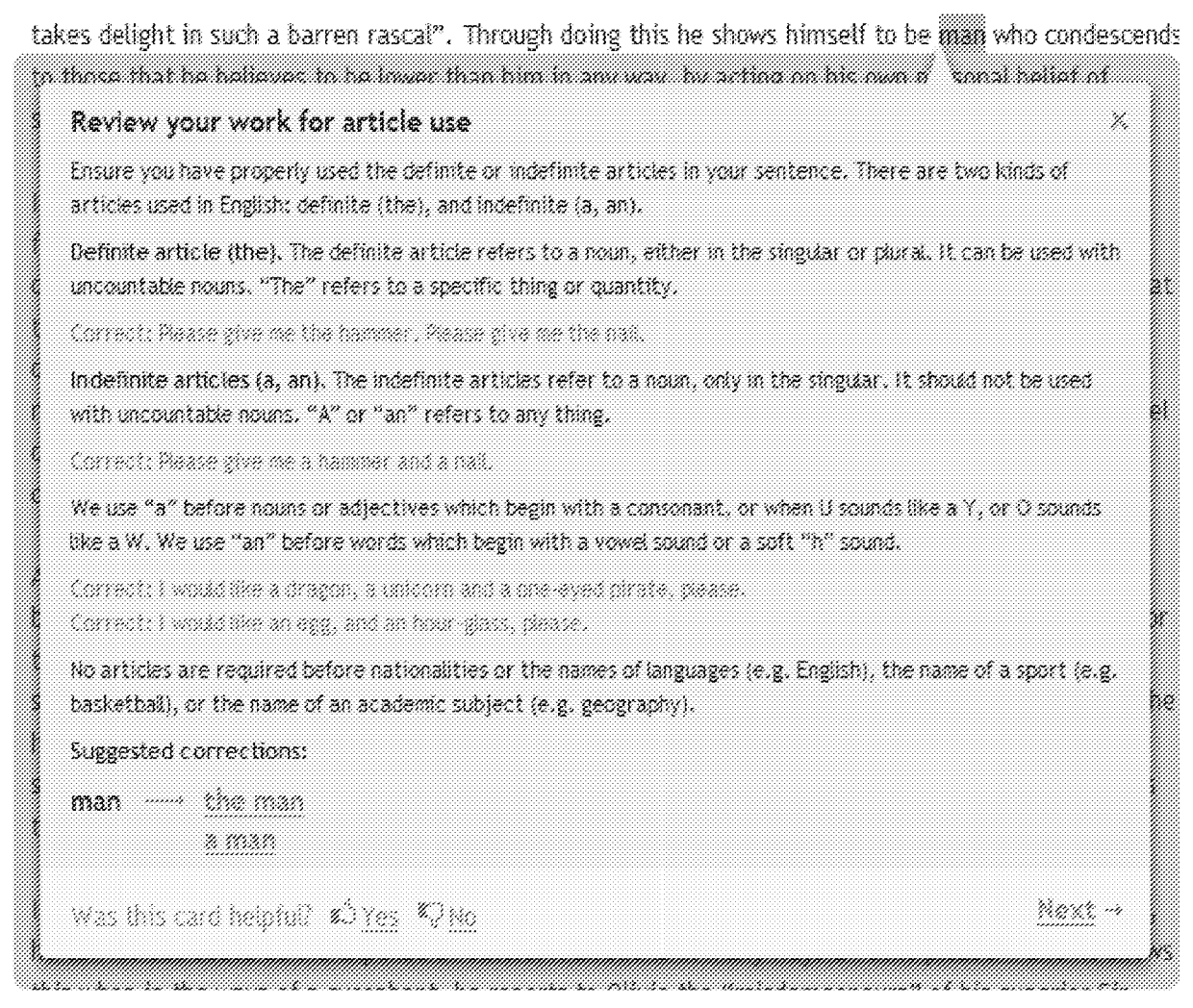
Figure 18:
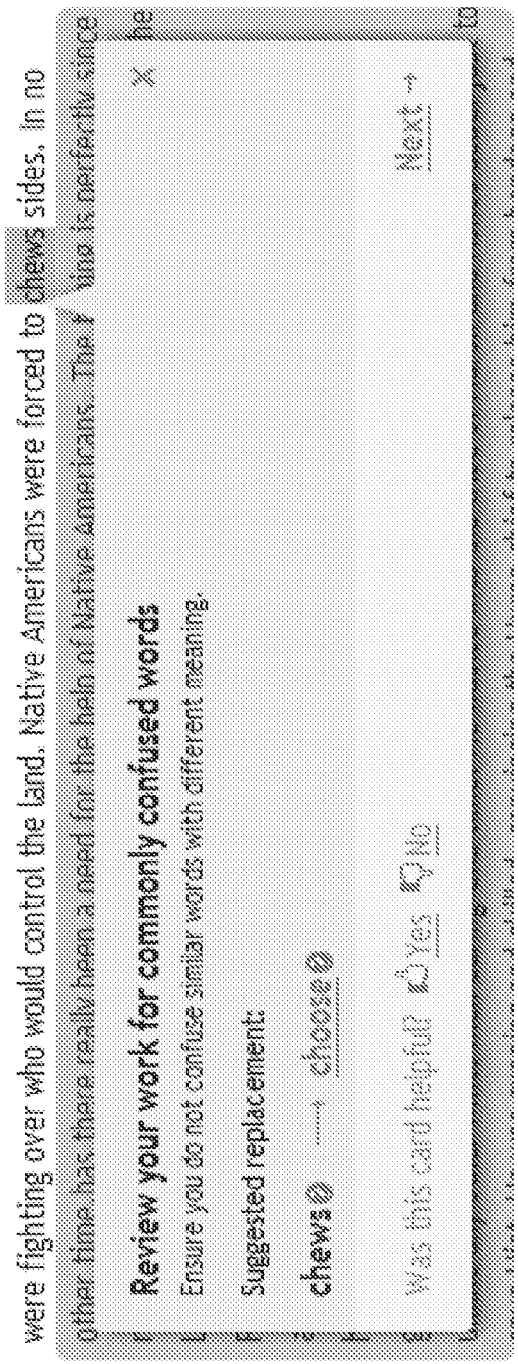
FIG. 18 depicts another embodiment feedback card.
Figure 19:
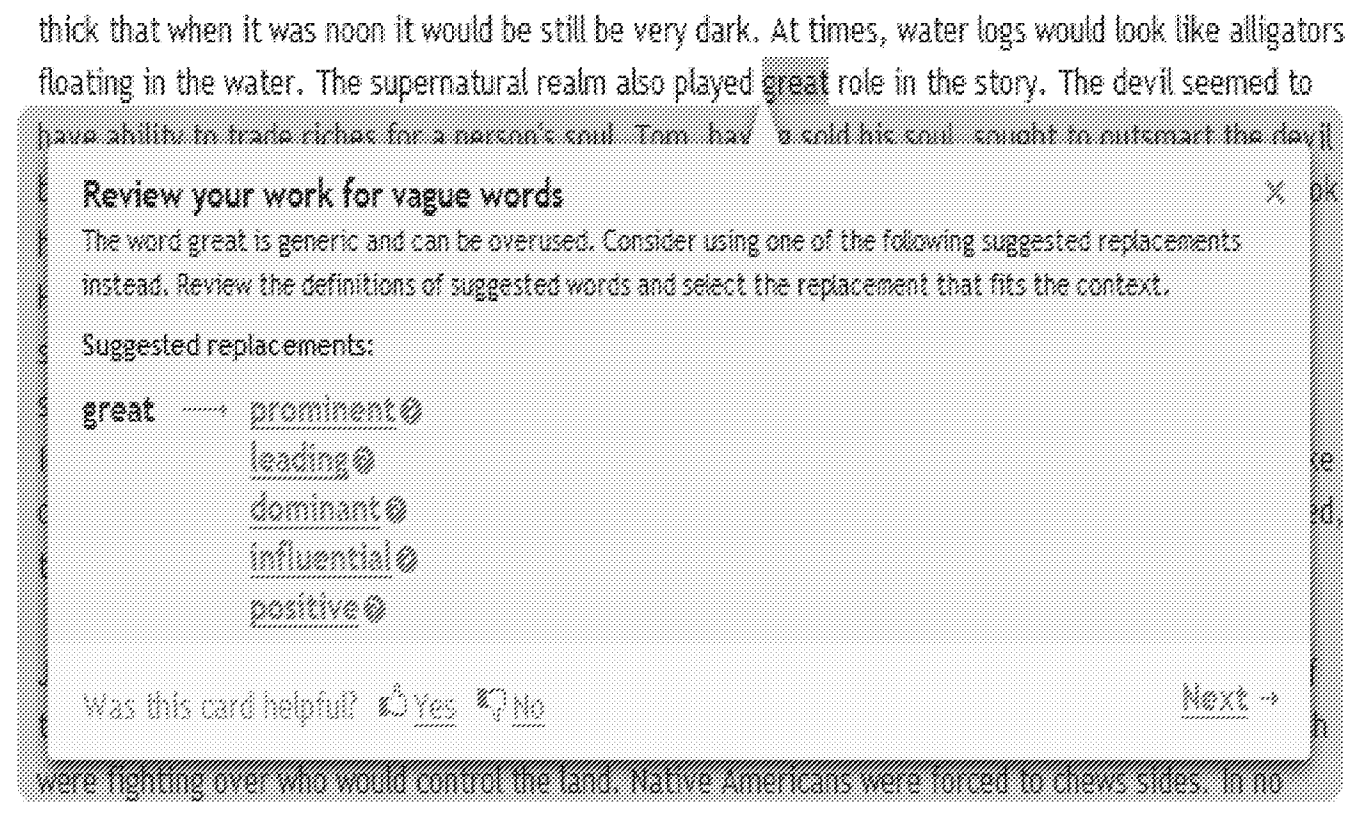

In other embodiments, where there is only a limited number of ways to correct an issue, a correction may be suggested, such as shown in FIGS. 17 and 18. Clicking on a correction suggestion may change an original word or phrase to a corrected one. A corrected word may be marked in the text. This may be an example of a word-level mistake for which direct correction suggestions are provided include misspellings, commonly confused words, such as in FIG. 18 and overused words (words that are not incorrect but are too generic for the context or overused), such as in FIG. 19.

Another type of reference card may be a citation audit card, which may be displayed whenever the text processing engine detects blocks of text that are taken from outside sources. The text processing engine may go back to the original source to extract information necessary to properly format citations and offer citations in different formats. If information necessary for formatting citation is not available, then the text processing engine may insert placeholders telling users what information needs to be inserted manually, such as in FIG. 20.

In embodiments, the grammar checking facility's interface and feedback process may be dynamic and interactive, or supplied in a static version of the detailed feedback. The static version may be generated by embedding feedback cards into the text of the original document, as opposed to displaying them one-by-one in the dynamic version, and saving the resulting document in one of the common file formats (such as HTML, PDF, and the like).

The text processing engine may keep analysis statistics on each individual user, and use this statistical information to determine the most typical, frequent, and the like, writing issues for this user. This information may then be used to generate personal writing handbooks, such as writing handbooks that include the information relevant to the top (such as 5, 10, 20, and the like) writing issues of a particular user. In an embodiment, one way the handbook may be generated by the text processing engine is by sorting writing issues made by a user in order of frequency and adjusting the frequency for standard false positive rates (such as frequency of an issue with 5% false positive rate is decreased by 10% while frequency of an issue with 15% of false positive rate gets adjusted by 15%, and the like). Another may be by taking N (any number) of the most frequent issues and retrieving relevant information from a writing handbook, such as an online writing handbook, a system developed and maintained writing handbook, and the like. Another may be by putting the resulting information in a file of a common format (HTML or PDF). This approach provides the user with a learning resource that combines the thoroughness of a writing handbook with very high level of personalization in accordance with the user's needs, thus leading to increased efficiency. The grammar checking facility may use the text processing engine and statistics to optimize content so that each user gets the most value out of the time spent on grammar improvement.

Figure 21:
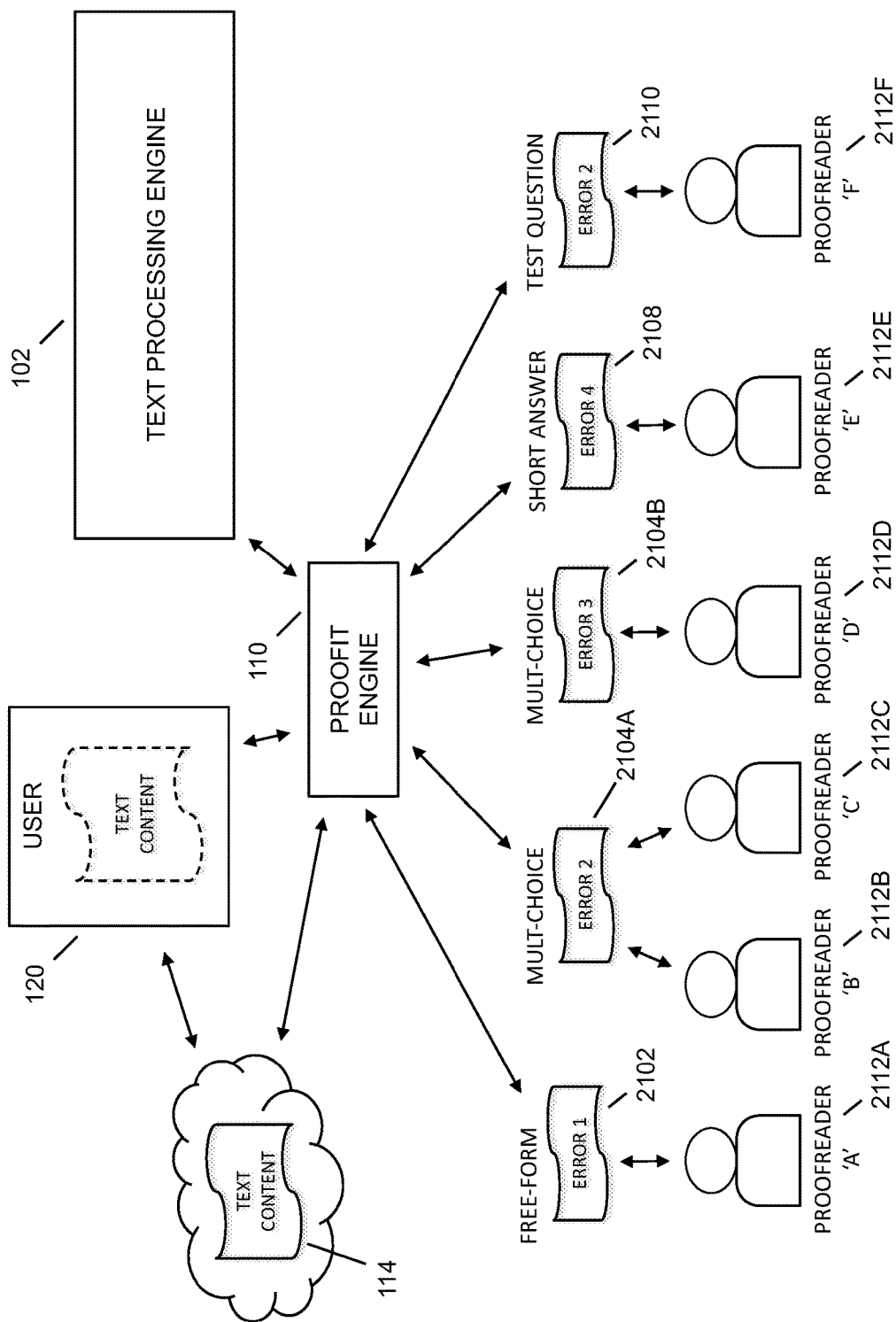
FIG. 21 depicts an embodiment process flow diagram for the proofit engine.

Methods and systems may provide for a crowd-sourced human-augmented software-based grammar checking process, where the process may iterate between computer-based grammar checking algorithms and managed human grammar checking, and include workflow algorithmic checking mechanisms to reduce what is sent to the human grammar checkers and to increase the speed and consistency of the checking of text sent to them for proofing. For instance, and referring to FIG. 21, a user 120 may provide a body of text content for grammar checking to the proofit engine 110 of the grammar checking facility 100, where the proofit engine 110 utilizes the text processing engine 102 to provide an initial computer-based grammatical analysis of the body of text to identify possible errors with the text. In embodiments, the text content may come directly from the user 120, from an Internet source 114, such as downloaded by a user, directly to the text processing engine, and the like. The text processing engine may then parse the text into portions of text containing the possible errors, and send the error portions to a proofit engine that manages sending of the error portions 2102. 2104A, 2104B, 2108, 2110 to human proofreaders 2112A-F, collecting the responses, resending the error portions if necessary, and determining the best correction to the error. In embodiments, there may be a proofit interface between the proofit engine and the human proofreaders. Further, the proofit engine may utilize the text processing engine to verify the corrected error. In embodiments, a plurality of proofreaders may receive the same error portion, where the proofit engine may then compare the answers received from the plurality of proofreaders to determine the most likely correction to make in association with the error. In an example, proofreader 'A' 2112A may get error 1 2102, but both proofreader 'B' 2112B and 'C' 2112C may both get error 2 2104A. 'Error 1' 2102 may be a freeform error report, 'error 2' 2104A and 'error 3' 2104B may be in a multiple-choice format, 'error 4' 2108 may be a short answer, and so on. In addition, there may be test errors being sent, such as for verification, redundancy, rating a proofreader, and the like. In this instance, Proofreader 'F' 2112F may get the same error 2110 that proofreaders 'B' 2112B and 'C' 2112C received, where the proofit engine 110 may utilize the results from proofreaders 'B' 2112B and 'C' 2112C to test proofreader 'F' 2112F. It will be appreciated by one skilled in the art that there are many possible combinations of how the proofit engine might utilize the proofreaders and error formats to manage the process of performing the grammar checking process in conjunction with the text processing engine, and that this example is meant to be illustrative and not limiting in any way. The proofit engine may utilize a plurality of error forms sent to proofreaders, including those with possible suggestions (such as multiple choice), those without a suggestion but with an error description (such as free form), fill in the blank(s) type of form, and the like. For multiple choice error forms, potential answers may be shown as only multiple choice, as multiple choice plus an option to bypass (such as with an 'ignore button', and the like), as multiple choice plus an option to bypass plus a free form field to enter the proofreader's own correction, as multiple choice plus an option to bypass plus a free form field to enter their own correction plus a free form field to enter their own correction of the entire sentence, and the like. For free form, text may be sent with context along with the indicted potential error, such as with preceding text and subsequent text. For example, the context may be a number of sentences before and/or after the potential error, a paragraph before and/or after the potential error, and the like. A free form field may allow proofreaders to correct an indicated error plus along with the option to bypass the error, correct the entire sentence with the highlighted error along an option to bypass, allow them to correct the entire paragraph with the highlighted error along with an option to bypass, and the like. In any case, proofreaders may also be able to respond that nothing is wrong with the text, thus bypassing any change. In embodiments, an error where the grammar checking facility knows the answer may be changed automatically and not shown to proofreaders.

Figure 22:
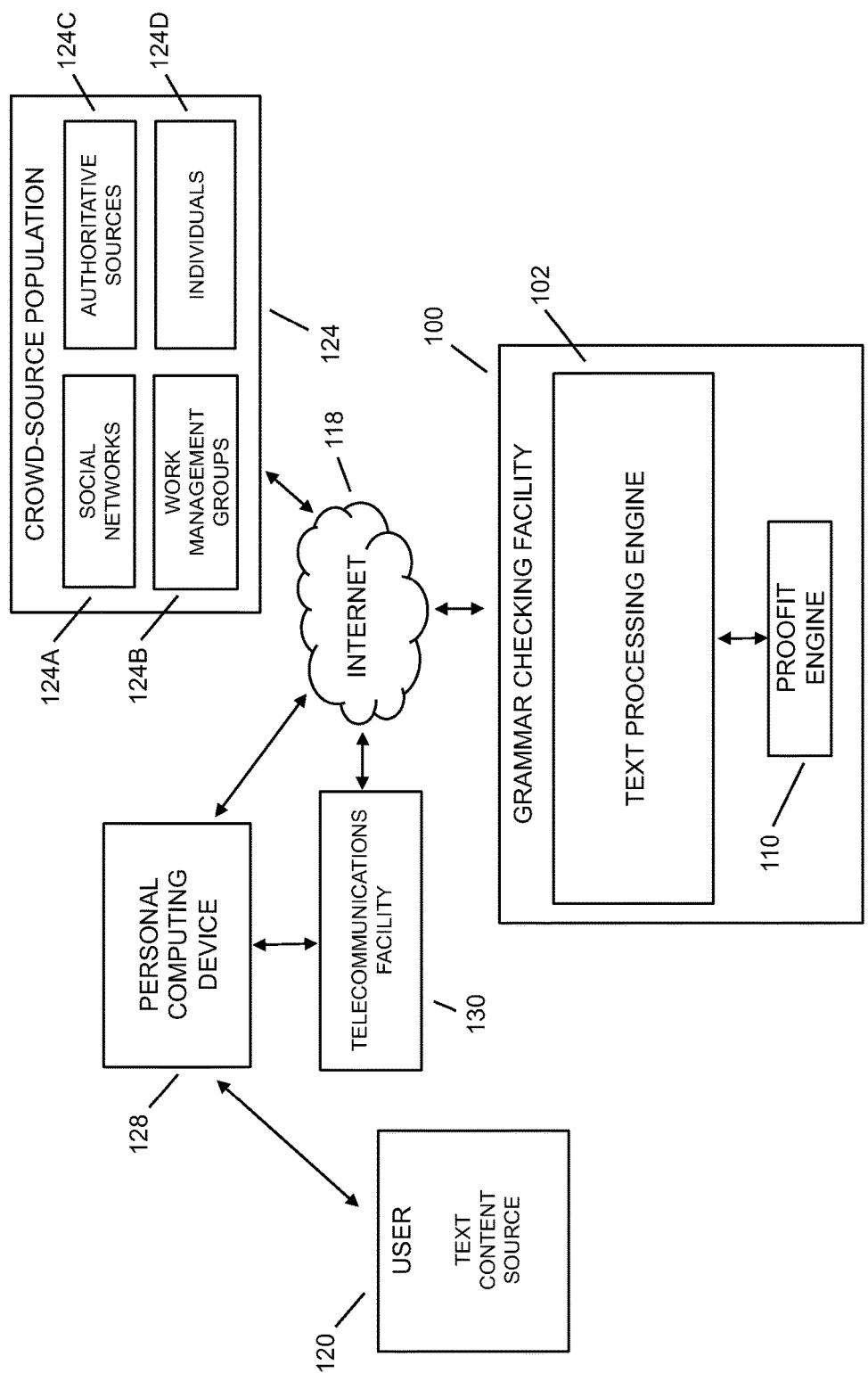
FIG. 22 depicts an embodiment block diagram for the grammar checking facility utilizing a crowd-source population for grammar checking.

In embodiments, the process of crowd-sourced grammar checking may include email workflow management, correction of mistakes by individual proofreaders (as opposed to proofreading the entire text with a single proofreader), providing human proofreaders with detailed mistake information (such as highlighting of a mistake in the sentence, explanation including words from sentence, and the like), automatic correction of some mistakes, processing of mistake collisions (such as when correction of one mistake may influence another mistake, both parallel path with re-check and sequential path with mistakes corrected one-by-one, and the like), quality assurance algorithms, and the like. Human proofreaders may be enabled to provide their reviews on a personal computer, a mobile computing device, through a specialized proofing computing device, and the like. Proofreaders may be able to conveniently provide their reviews from a mobile computing device in the course of their day, such as while riding in a car, bus, train, and the like, so that their services may be provided with a quick turn-around, for extra cash to the proofreader, conveniently to the proofreader, and the like. Referring to FIG. 22, a grammar-checking facility 100 may include a text processing engine 102, a proofit engine 110, and the like, which interacts with the user 120 and the crowd-source population 124 through a personal computing device 128 (such as a PC, a mobile computing device, and the like) across the Internet 118, through a telecommunication facility 130 (such as a cell phone network, and the like), a cable modem, and the like. The crowd-source population 124 may be authoritative sources 124C in grammar structures and errors, sources through social networks 124A, sources through work management groups 124B, individual contributors 124D, and the like.

In embodiments, the workflow of the process may begin with a user creating text, such as in any text processing software, including word processors, content management and publishing systems, email systems, and the like. The user may then have an option to submit the text to the grammar checking facility for correction. A submission workflow may depend on the context and type of the document. Note that other applicable workflows are described herein. As a part of the submission process, the user may choose a number of settings (such as each setting can be left in a default setting or pre-set in a user's account, and the like). Some settings may involve additional fees, as they may require greater resources to execute, such as based on text genre; types of checks to perform (such as spelling, grammar, style, formatting, text enhancement, any combination of these, and the like); quality of checking, which may impact selection of the human proofreaders involved in the process, level of redundancy and enable/disable automatic corrections of some mistakes by software without human help; speed of processing, which may impact prioritization of the tasks related to proofreading the document in the queue; and the like.

After the user has generated the text, it may be sent to the grammar checking facility over the Internet where it may first be checked by a computer-based grammar checker, such as through a grammar checking algorithm of the text processing engine as described herein. The engine may identify potential mistakes (such as all potential mistakes, and the like) and generate corresponding error 'cards', which may offer correction suggestions, offer explanations of what could be wrong, provide background of the type of error, examples of the type of error, remedial notes, and the like. Some mistakes may be corrected automatically by software, which may use the text processing engine. The grammar checking facility may utilize the settings tags described herein to better fine-tune checking process.

Figure 23:
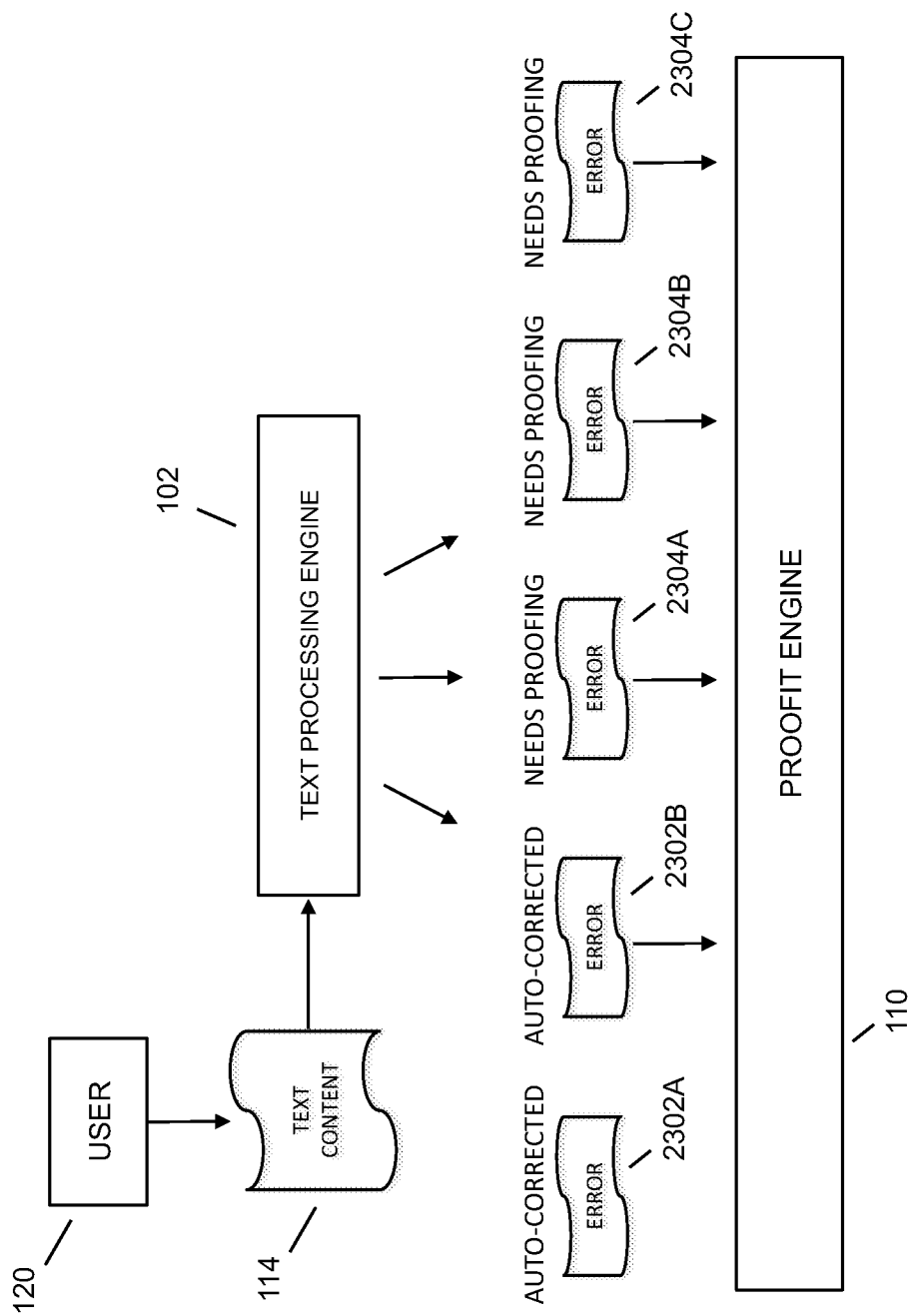
FIG. 23 depicts an embodiment process flow of errors being provided from the text processing engine to the proofit engine.

In embodiments, the proofit engine may manage the correction of at least one of a plurality of potential mistakes 2304A, 2304B, 2304C detected by the text processing engine (i.e. mistakes not automatically corrected) utilizing human proofreaders. Referring to FIG. 23, the text processing engine 102 may optionally send an error 2302B that has been automatically corrected to the proofit engine, such as for verification, and the like. Other auto-corrected errors 2302A may optionally not be sent to the proofit engine, such as for errors that have a high probability for being corrected automatically by the text processing engine 102. For instance, there may be 40 potential mistakes that need proofing, and the computer-based grammar checker turns each one of these into a question card to be sent to the proofit engine and on to the human proofreaders. In embodiments, the text processing engine may send all background it has on a given error (such as suggestions, descriptions, and the like) in raw form to the proofit engine, and the proofit engine may then turn this error data into cards suitable for presentation to individual proofreaders. The question card may be multiple-choice (such as in the case of those issues that the text processing engine has multiple correction suggestions for), freeform (for those issues that the text processing engine only has explanations for); and the like. For example, a question card may be presented in such a way that someone viewing the card (such as a proofreader, and the like) sees the original text (with potential error highlighted), and suggestions or explanations provided by the text processing engine.

In embodiments, the process may include text obfuscation. For instance, the proofit engine may search the text for any words that may be confidential or sensitive. These words may be highlighted individually in each document, as part of a separate list of words provided by the user in the proofit software, such as during installation, collected over time, and the like. The proofit engine may also maintain account-wide lists for accounts with multiple users. Any confidential/sensitive words may be replaced by other words with identical grammatical properties before being added to the cards, allowing an editor to correct the error without seeing any confidential/sensitive information. Alternately, the user may specify that the meaning of the text passage is entirely confidential. In this case the grammar checking facility may provide text obfuscation to all portions sent out to human proofreaders such that the human proofreaders will not be able to sense the meaning of the original text, or portion of text. The ability of the grammar checking facility to provide text obfuscation may be aided through the process of sending proofreaders limited portions of the original text, and therefore only requiring the grammar checking facility to obfuscate each individual portion, as opposed to a process that is required to obfuscate the entire original body of text.

In embodiments, question cards may be routed to proofreaders through an online labor marketplace of editors (such as Amazon's Mechanical Turk, CrowdFlower, and the like), to an internal group of editors/proofreaders, to individual proofreaders, and the like. Question cards may be sent to different proofreaders in a parallel manner in order to speed the process of competing the correction of all errors found in the body of text. Alternately, a number of errors may be sent to a single proofreader, such as in the case of multiple errors in a single sentence. In this case, the proofit engine may have determined that sending the entire sentence with multiple errors to the same proofreader is deemed potentially more efficient than sending them separately to different proofreaders. In embodiments, the proofit engine may use any combination of serial and parallel proofing threads to proofreaders as deemed by the grammar checking facility to meet the goals of efficiency, timeliness, accuracy, cost, and the like, for grammar checking the body of text.

In embodiments, the initial computer-based grammar checking algorithm may identify and categorize errors, such as into a possible error, a certain error, an uncertain error, indeterminate, high confidence, low confidence, and the like. The initial assessment of potential errors may include a confidence score as to how certain the grammar checking facility is that the potential error is indeed an error. For potential errors for which the grammar checking facility is uncertain, the grammar checking facility may send the text passage with the error to a proofreader to judge whether an error exists. If the proofreader determines that there is an error, the grammar checking facility may send the portion of the text associated with the error to a proofreader for correction. This may be the same proofreader or a different one. An alternate process may simultaneously send the error to a first proofreader for a correction and to a second proofreader to verify that there is indeed an error. In this instance, the first proofreader may have the option to declare that there is no error, and the grammar checking facility may compare the conclusion of the first and second proofreaders to determine an action, such as to conclude there is no error, to conclude there is an error and to accept the correction of the first proofreader, and the like. In addition, there may be a plurality of proofreaders, such as to correct an error, to verify the presence of an error, and the like, where the grammar checking facility considers the collective responses from the proofreaders in the response back to the user.

Each individual proofreader may be ranked on their level of accuracy in general and/or ability for each type of error. In embodiments, the grammar checking facility may send the same error to a plurality of proofreaders, where the grammar checking facility then compares the responses from the plurality of proofreaders in order to rank each proofreader, such as for accuracy in judging a specific error type, reliability in judging an error, timeliness in response, availability, cost, style, nationality (such as U.K. vs. U.S.), and the like. These rankings may then be used in the grammar checking facility's consideration of what proofreaders will get what errors, the weight given to a particular proofreader's response as related to the error, and the like. In addition, the grammar checking facility may run test errors with known errors to a plurality of proofreaders in a process of developing or maintaining a ranking for proofreaders. For example, the grammar checking facility may send a series of known errors to twenty different proofreaders, and create or update the ranking for the proofreaders. The ranking may be numeric, such as ranking each proofreader on a scale of 1-10, and the like), categorical, such as 'highly ranked', and the like. There may be ranking over different dimensions, such as for technical correction, style, and the like. The grammar checking facility may use the rankings as a factor in determining the correction, such as applying a weight to a plurality of proofreader responses in determining what the correction should be, if there is any error at all, and the like. For example, a user may provide a body of text to be grammar checked. The grammar checking facility may then parse out the errors, categorize the errors, and the like, and send the parsed portions with errors to a plurality of proofreaders. The responses may not be in complete agreement, and in this case the grammar checking facility may use the associated proofreaders' rankings to aid in determining the response back to the user, such as using numerical rankings to create a score, and using a threshold applied to the score to help judge what the response back to the user should be. In embodiments, each error card may be routed to a number of human editors with higher rankings for that error or in general. The first editor to accept the task may correct the error and return the correction to the proofit engine. The correction may be a change (such as multiple choice selection, freeform answer, and the like), or an 'ignore' command if the text processing engine was incorrect in flagging of the error (that is, in the case where the original text was correct).

In embodiments, the grammar checking facility may also use other known, licensed or publicly available, algorithms for providing redundancy in quality and speed of corrections and in ranking human editors. The grammar checking facility may also use industry-standard redundancy and quality assurance algorithms designed to work with anonymous human editors, where ranking of editors by accuracy is not possible.

If certain errors are embedded in other errors (such as two grammatical errors made in association with each other, and the like), optional methods may be applied depending on the type of error and the statistics of effectiveness of each of the methods for particular types of errors. One method may be the two errors are sent out simultaneously (each with the other error present, but not highlighted), so that the presentation of each error contains the other error. Another method may send the first error for correction (with the second error present but not highlighted), and after the correct answer is received, the second error would be sent out (this time with only the second error present). Another method may send the two errors together on a single card to the same editor, who would correct both simultaneously. In embodiments, this card may be uniquely designed to highlight both errors at the same time, and could include a combination of multiple choice and freeform answer fields.

As the proofit engine receives corrections to errors, some will likely arrive before others. As the grammar checking facility is waiting for the correction results of some errors, those error corrections that return first may be spot-checked by the text processing engine and/or other human proofreaders at random, such as for quality assurance, proofreader ranking, and the like. Any error correction selected for spot-checking may first be run through the text processing engine. If the text processing engine says it may not be correct, it may then be sent to other proofreaders for a second check in the process, as described herein. Several scenarios are possible. For instance, and in a series of non-limiting examples, if the first check was 'ignore' (no change made) and the second check is the same, the error will be considered resolved. If the first check was a multiple-choice answer and the second check was a multiple-choice answer, the answers will be compared and considered resolved if they're the same. If the first answer was a freeform answer, the results of the second check will be run through the text processing engine again. If the text processing engine determines that there is no error, it will be considered resolved. If the engine says there is an error, then the new version will be submitted to proofreaders for checking in the process as described herein. Alternatively, the first free-form answer may be sent to a human proofreader for a second check, and if the human proofreader marks the sentence as correct (such as they press "Ignore", and the like), the error is considered corrected, but if the second proofreader makes changes, the sentence is sent through the process once more. When the correct answers are determined, those proofreaders who answered correctly will get a higher score for this error type, and those who answered incorrectly will get a lower score for this error type.

When all errors are corrected individually, the document is reassembled. This could happen in real time (as each corrected error is returned), or at once after all errors are received. In embodiments, the turn-around time from the user submitting the text to the time the user receives the corrected text may be a short period of time (such as 15-30 seconds, one minute, and the like) due to having a large proofreader labor pool. That is, the turn-around time may be independent of the number of errors in the document because each error is potentially sent to a separate proofreader in the crowd-source population. For instance, if there are 30 errors in a document, the errors may be sent out to 30 different proofreaders (more if there is a desire to incorporate redundancy, such as to accommodate proofreaders rating systems, quality control, and the like), and so the turn-around time may only be a function of the error that takes the longest time to correct.

After the correct document is assembled, the software may also create a 'track changes' (redline) version of the document, showing all changes between the original document and the corrected document. In embodiments, if the user did not mark the document/email as critical, for review, and the like, it may be returned to the user for review, or alternately, the document may be sent directly to the intended recipient without input from the user. If the user marked the document/email as critical, for review, and the like, it may be returned to the user for review, and if the user accepts the corrected document/email, then it will be sent. If the user doesn't accept the document, the user may be presented options, such as to make changes themselves and then send, without resubmitting to the grammar checking facility, make changes themselves and then resubmit to the grammar checking facility, and the like. In embodiments, there may be cases where the user may be allowed to highlight a portion of the text and send it straight to human proofreaders if the user believes that it is incorrect, such as either after the user has received corrections back or in the user's initial submission of text to the grammar checking facility.

In embodiments, users may be able to see multiple versions of their document, such as original, final, track changes, and the like. They may see this in a variety of forms and locations, including a 'proofit folder' created by a proofit plug-in to a document/email management application, in their online account, in an email sent to them confirming the email was sent (and thus in their email inbox), and the like.

The grammar checking facility may provide charge plans to users of the service. The grammar checking facility may offer several different pricing models, including as 'by mistake', such as the user agrees to a predefined rate of 20 cents for each mistake the software corrects, and the like); 'by length', such as the user agrees to a predefined rate for each word, paragraph, page, and the like; by document, such as the user agrees to a predefined rate for each document, email, text block, sent to the grammar checking facility, and the like. The grammar checking facility may offer different payment plans, such as a subscription plan, monthly recurring fee, and the like. The grammar checking facility may provide for discounts, such as including some number of credits for genre, types of checks to perform, speed of processing, and the like. The grammar checking facility may offer Pay-per-submission, where the user pays per submission at the time of correction. In embodiments, it may also be possible that the proofit engine could allow users to correct mistakes for other customers, and in return give them credits.

The grammar checking facility may provide payment plans to the proofreaders. For instance, proofreaders may be paid for each mistake they correct (such as each time they correct an error, they receive a payment, and the like). Payment may be determined based on a variety of methods (individually or collectively), including a bidding system, a fixed rate, a rate dependant on the perceived complexity of the question, a rate dependant on providing a correct answer (with reduced or no compensation for incorrect answers), based either on an individual question basis or on an average of questions, a rate dependant on completing the task in a certain amount of time, and the like. Proofreaders may be paid daily, weekly, monthly, and the like. Proofreaders may also receive payment directly to a prepaid card or bank account.

Figure 24:
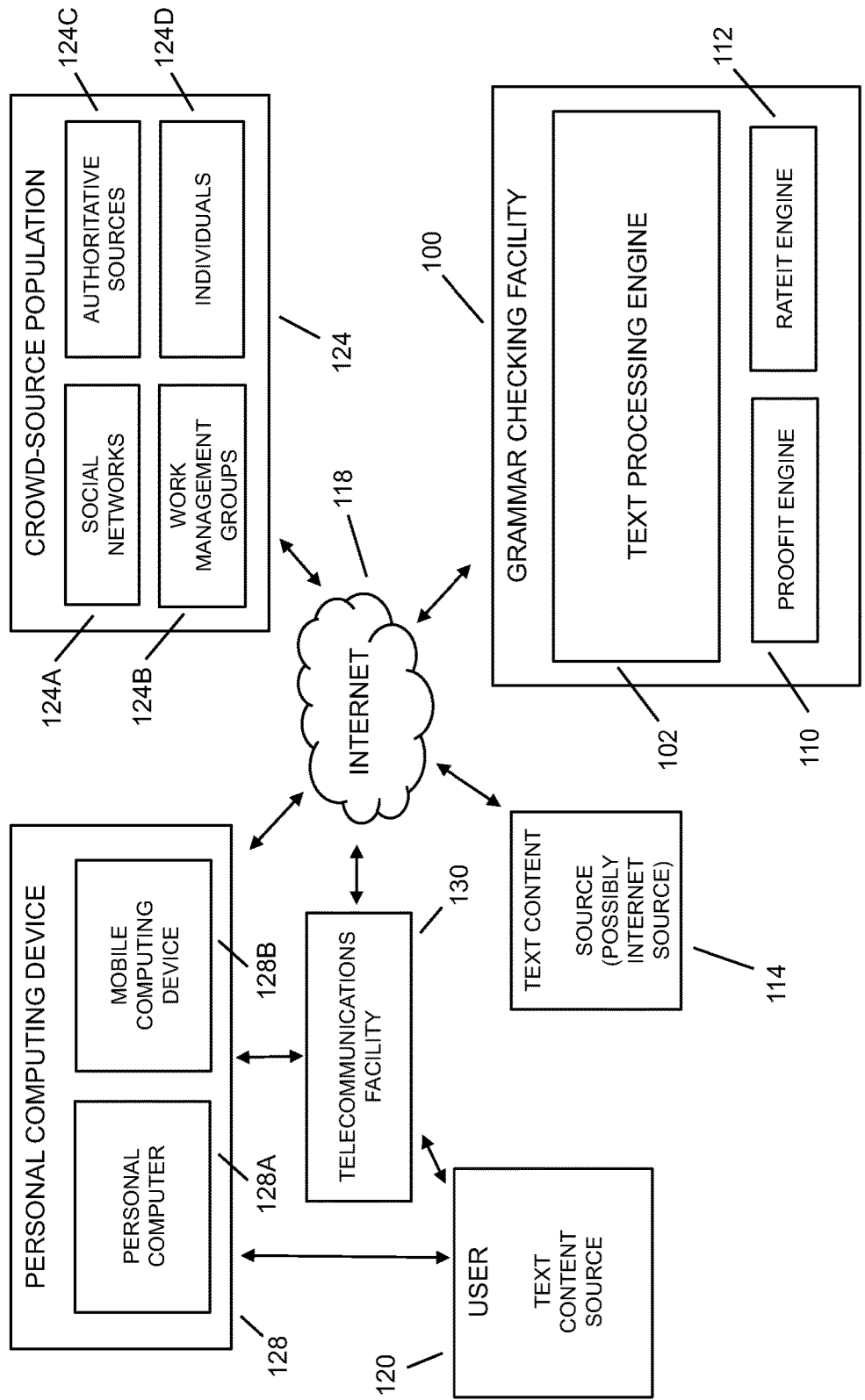
FIG. 24 depicts an embodiment block diagram of the grammar checking facility utilizing a rateit engine in association with grammar quality.

Methods and systems may provide for a software grammar checker for inferring the quality of text content. For instance, the grammar checking facility may be applied to text content in a document, an email, a website, a search result, and the like, and infer some quality characteristic of the text content in order to categorize the text content. In an example, a document written by an individual may be taken into the system in order to infer the quality of the writing, such as in comparison with other documents by the same author, as compared to other authors, in order to qualify the document to be considered for publication, in order to qualify the document to be considered for inclusion to an online publication, such as website, blog, wiki document, and the like. In another example, the grammar checking facility may be applied to a search result, where text content from search results is grammar checked for quality in order to provide a writing quality rating back to the searcher for the search results. In embodiments, the application of the grammar checking facility may save time for a user that requires a certain level of writing quality associated with an activity, whether that activity is grading, proofing, consideration for publishing, searching for information, and the like. In embodiments, the user may be able to specify a level of quality or characteristic of quality to the system depending on the user's needs. Referring to FIG. 24, a grammar checking facility 100 may include a text processing engine 108, proofit engine 110, rateit engine 112, and the like, where the rateit engine 112 may provide for determining a quality characteristic of the text content. In embodiments, there may be a rateit interface between the rateit engine 112 and the quality checking facility 100, the Internet 118, and the like. In embodiments, the grammar checking facility 100 and associated rateit engine 112 may interact with text content sources 114 across the Internet, such as on websites, wikis, through search results across the web, blogs, from third-party sources and the like. The user 120 may communicate with the grammar checking facility 100 with a personal computing device 128 across the Internet 118, through a telecommunications facility 130, such as a cell phone network, and the like. The user 120 may also provide text content sources through the personal computer device 128 (such as a mobile computing device 128B, mobile phone, PDA, personal computer 128A, and the like). In embodiments, the rateit engine 112 may utilize a crowd-source population 124 in its execution, as described herein.

In embodiments, the rateit engine may ingest content from a text content source, and output a quality score based on the grammatical correctness and elegance of the content. After receiving the target document text, the rateit engine may first send it to the text processing engine, which reviews the text and returns a list of potential mistakes and enhancement opportunities to the rateit engine. The rateit engine may determine a normalized rating for the content versus a general corpus or a corpus of the relevant type of texts (such as webpage, emails, user generated content (UGC), books, blog posts, news articles, school essays, and the like). The rateit engine may provide this through examining the mistakes and (possibly) enhancement opportunities returned for the target text content, from the text processing engine. In embodiments, it may rate mistakes based on certainty of a mistake, severity and/or importance of a mistake, and the like. It may rate enhancement opportunities based on the certainty of alternatives, severity and/or importance of the enhancement opportunity, and the like. It may also consider the total number of mistakes and enhancement suggestions, normalized for the size of the document. Based on these inputs, the rateit engine may determine a quality score for the text, such as on a scale of 0-100, with a characteristic descriptor, such as high quality, low quality, and the like.

In embodiments, the quality score may be used differently for different types of text content and scenarios, such as for searches, UGC, email/spam filtering, professional writing or content creation, and the like.

Figure 26:
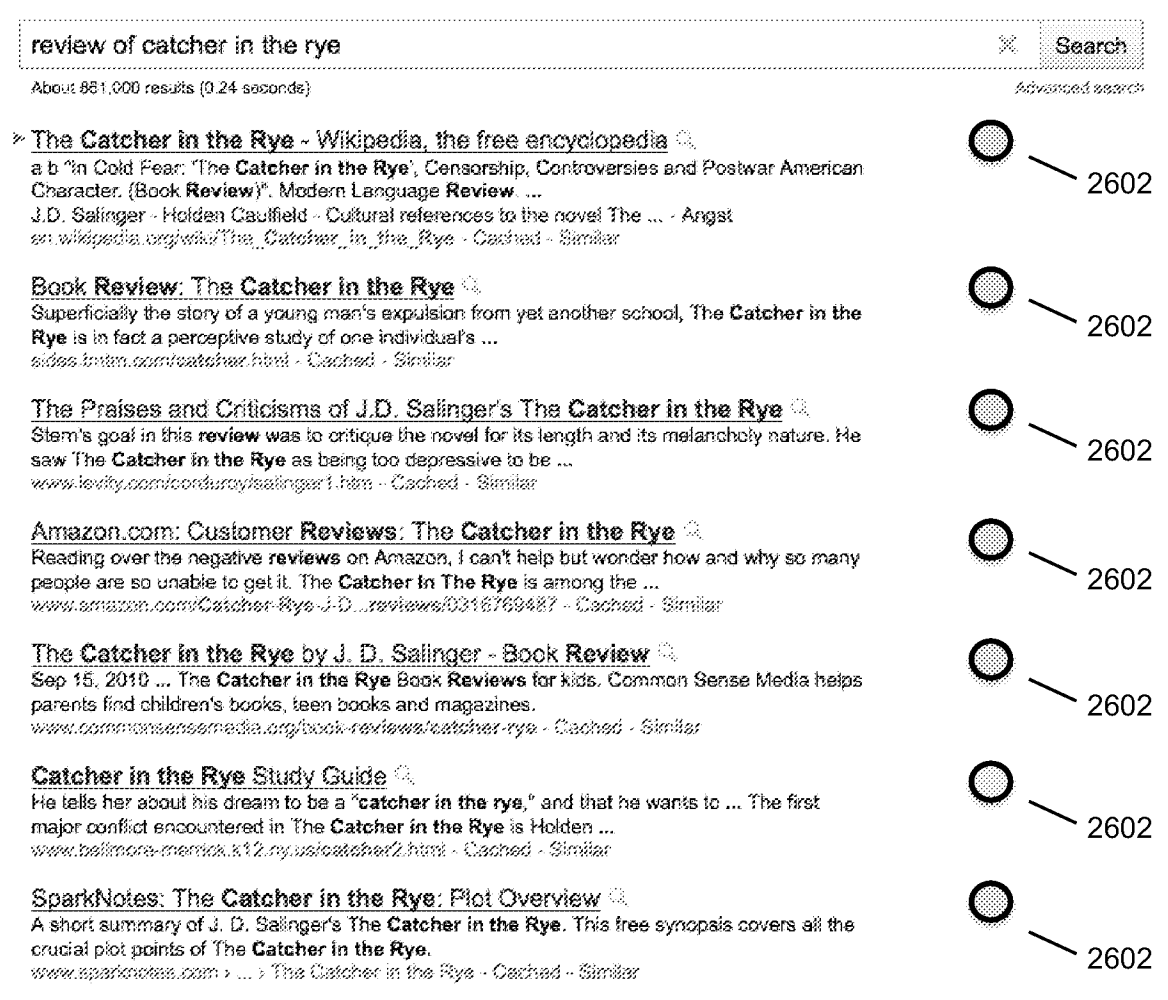

In an example of a search text content scenario, such as filtering search results based on grammatical quality of web pages: the rateit engine could automatically crawl all new and existing web pages, and submit each page for a quality rating. The quality rating could then be used to prioritize or reprioritize search results, using the grammatical quality as an additional filter or signal in the weighting formula. Referring to FIG. 25, the rateit engine may provide for an indication of how critical the errors in the text content are, such as high/critical errors 2502, medium criticality errors 2504, low criticality errors 2508, very low criticality errors 2510, FYI errors, and the like. This could be done in a number of ways, including by licensing the technology to a search engine (such as for Google, Bing, and the like), by providing a search engine that would use grammatical quality as a key search filter, by providing users with a downloadable browser plug-in, and the like. For the plugin, it could recognize whenever the user is searching, and filter results based on the quality score, where results could be filtered by placing a quality indicator (such as red, yellow, green light, and the like) next to each search result in the browser, by reordering the search results based on the quality score, and the like. In embodiments, the search criticality of the error or a relative quality indication for the search result may be indicated with each search result, webpage, and the like, such as with a color indication of the search result, a colored symbol (such as a circle, square, icon, and the like), a numeric indication, and the like. In embodiments, the content sources found on the web may be discovered through crawling the web in advance, and having the quality ratings ready for when they are included in a user search result. Referring to FIG. 26, an example of a visual indication 2602 may be a colored circle next to each search result indicating the relative quality writing for the text content of the search result, such as green for high quality, yellow for medium quality, red for low quality, white for undetermined, and the like. In another embodiment, the rateit engine could indicate changes in the quality of an on-line text content. For example, a user may be interested in maintaining the quality of writing submitted to their blog or to a wiki site they maintain, and the rateit engine could send the user an indication of any changes to the quality of the associated text content, such as periodically, when a change is detected, when a quality level falls below a specified level, and the like.

As social networks, Q&A, and other sites creating UGC content grow, they may be looking for ways to determine the quality of their UGC, for use in onsite rankings, and the like. The rateit engine could provide these sites with a quality score for each piece of UGC created. This could be done in a number of ways, such as at the time of content creation, after content creation, and the like. At the time of content creation, when users submit their UGC, the rateit engine could check the content in real time. If the content doesn't meet a threshold quality score, the site could automatically reject it, or return it to the user in real time for editing. In embodiments, the grammar checking facility may provide a graphical user interface for the editing process. After content creation, the UGC could be fed to the rateit engine and a score returned, such as in the same manner as at the time of content creation. The grammar checking facility may use the score to prioritize high-ranked content in internal search results, list, catalogs, and the like; flag content for editorial review and/or deletion; assign quality points or special tags to contributors to promote high quality of content, determine the amount or rate of pay for paid contributors, and the like.

In embodiments, ISPs, email system providers, email client developers, and security companies may include the score from the rateit engine in their algorithms, to help in detecting spam or scam communications (such as emails, IMs, and the like). These emails often have low grammatical quality, and as such, a low grammatical score could act as a signal to help identify a spam/scam email, especially when coming from an unknown domain.

In embodiments, quality assurance for professional writing or content creation may include companies using the rateit engine to evaluate quality of writing of employees or a contractor where their output includes text. Such employees may include writers, bloggers, journalists, content creators, SEO companies, copywriters, customer support representatives and the like. Scores from the rateit engine could be used for initial quality checks while recruiting, establishing thresholds for content acceptance for publishing, bonus calculation and promotion of writers, and other niche scenarios, such as routing requests from higher-end clients to higher-ranked customer support representatives.

In addition, the rateit engine could be used to inform content owners (such as website owners, bloggers, social media profile owners, and the like) of grammatical errors on their site or texts, in an automated fashion. Once the rateit engine has a rating for a webpage, it could send the webpage administrator or owner an automated electronic communication, alerting them to the grammar quality score, and that of competitors, and the number of potential errors on their page/s and/or site. In addition to providing a public service, this message could also include information on how to subscribe to the grammar checking facility to fix the errors.

Methods and systems may provide for automatic grammar correction, automatic text enrichment, and the like, such as when there is some limiting characteristic associated with the user's computing input interface, user environment, and the like. For instance, in the case of a user automatically sending a communication without review of the suggested grammar changes from the grammar checking facility, the user may do so because they are under time constraints, composing from a small keyboard and/or a small display such that review has an increased difficulty, mobile and so reviewing is inconvenient, have limitations in their own grammatical abilities, and the like. In the case of a user enabling automatic enhancement functionality to their communication, a user may be under input constraints such that errors may be otherwise expected, and the user enables the enhancement functionality to minimize these expected errors. In embodiments, the user may utilize automatic sending and/or text enhancement while generating an email, an SMS message, a blog entry, a micro-blog entry (such as tweeting, and the like), a report, notes, a diagnosis, a traffic ticket, a legal report, a medical diagnosis report, a note to a medical system, a handwritten text input through a tablet, a security report, and the like on a computing device, through processes described herein, before transmitting the text content. These processes may be especially useful for generating text on an input device with input limitations, such as on a small laptop, a smart phone, a mobile computing device, a computing device with a relatively small keyboard and/or display, a tablet, an iPad, a computer pad, a handwriting stylus on a pad, a character recognition device, and optical recognition device, a computing device where the user is utilizing a voice-to-text input, and the like. In this environment, the user may be making errors they would not make in a non-limiting environment such as sitting down in front a personal computer with a full sized keyboard and display. In another instance, the user may be utilizing voice recognition software, such as in association with an email application, an SMS message, and the like, and as a result incur additional errors resulting from the process of converting speech to text. As an aid to the user under these conditions, an application on a computing device may include a option to automatically send and/or enhance the text content through the grammar checking facility before transmitting it, such as with a 'proofit' button where the work flow for grammar checking in concert with human proofreaders as described herein provides an automatically corrected and/or enhanced version for transmission. Referring to FIGS. 1 and 1A, the personal computer may be a personal computer, laptop, tablet, mobile computing device, and the like, and may communicate with the cloud-computing environment through a wired Internet connection, a wireless Internet connection, through a telecommunications facility (such as a cell phone network or cable modem), and the like. Methods and systems may be implemented on the server-side, as a hybrid of server-side and client-side, entirely on the client side, and the like. For example, the system may be running in a cloud server environment but available to the user through a mobile application as a service, such as through pressing on a 'proofit button", a 'proofit and enhance button', and the like before sending. In another example, a version of the system may be running through an application on the mobile device and providing grammar checking in the background as the user composes text, where the grammar checking facility is running remotely on a cloud server, running resident on the mobile device, running in a hybrid configuration between server and the client, and the like. In embodiments, methods and systems described herein may be implemented through workflows associated with text content on a mobile device.

In embodiments, a function for automatically sending a communication without review may include a user interface element, such as a "Send with Proofit", "Submit with Proofit", and the like button that lets a user send an email, publish a document and the like, finishing the process instantaneously without extra delay or extra steps for the user, while the document is actually proofread through the grammar checking facility before being sent/submitted. In embodiments, the grammar checking facility's algorithm(s) may take into account some specific characteristic of a computing facility with some limiting input characteristic, such as with a mobile device input, or any other type of input influenced by the device. In an example workflow for use of the grammar checking facility and proofit engine as described herein, a user may create text in an electronic messaging system, such as email, mobile email, and the like; in a document creation or publishing system, such as blog, twitter, content management platform; and the like. A document may be created using a personal computer or a wide variety of devices (such as with a mobile computing device, tablets, handwritten input devices, voice input devices, and the like). Once the document is created, a user may have an option to send, save, or submit the document. Submitting the document may be accomplished in a plurality of ways, such as by an alternative to the standard "Send"/"Save"/"Submit" button (such as with a "Submit via Proofit", "Proofit and Submit", and the like), via establishing a default setting that would alter the functionality of the standard "Submit" or "Send" button to include the process utilizing the proofit engine, and the like. Once the user submits the document to the grammar checking facility, the document may appear to be submitted to the end user, where all further steps do not require user attention.

In embodiments, a function for enhancing text content, such as created on mobile devices or other devices with input limitations, the grammar checking facility may "know" the limitations of devices and related necessary corrections. Under these circumstances, users may know that their text will be corrected and potentially enhanced, so they would not have to worry about formatting, spelling, abbreviations, slang, and the like while composing on a limited device or under challenging conditions. Examples of where enhancement as a function of device and/or communication class may be useful include professional email, personal email, legal, medical, police reports, doctor notes, voice-recorded log entries, and the like, where the required quality of the generated text content is higher than more casual or personal text content (such as a personal email, SMS, and the like).

In embodiments, a document may be automatically redirected to the grammar checking facility, including with tags indicating the context of the document. Tags may include the device originating the document (such as an email client, mobile device, tablet device, handwriting input, voice input, and the like). Tags may include the type of the corrections needed, which may be any combination of spelling, grammar, style, formatting corrections, and the like. Combinations of needed corrections may be specified by the user in the user profile, with different default pre-sets supported for different types of devices and usage scenarios (such as mobile devices vs. desktop, email vs. blog post, and the like). Users may also alter default combinations for each specific document via an additional menu. A genre may be pre-set in advance or selected during the submission of the document, such as via a drop-down menu or a list of radio-buttons.

In embodiments, the document may be enhanced by the grammar checking facility including a combination of software identifying potential spelling, grammar, style and formatting issues, and automatically correcting some of them, and human workers correcting the identified issues that software could not correct automatically. During the document-improvement process, software may identify issues belonging to the user-selected set of corrections (i.e., spelling, grammar, and the like), use information tags about the originating device of the document and the genre of the document to apply the most appropriate set of standards while identifying the issues, and the like. Human workers may correct issues identified by the software, and may also rely on device and genre tags to make more accurate corrections, as described herein. Both software and human workers may refer to a central database, such as including a list of supported document genres and source devices with information on specifics of each genre or device. Such information may include information on genres, for different devices, and the like. For genres (such as including professional genres such as healthcare, legal, and executives), there may be exclusions of certain grammatical rules and mistake patterns, as well as adjustments of sensitivity thresholds for certain grammatical rules and mistake patterns, as described herein. For different devices, accommodations may include issues most typical for each device and suggested correction methods for each such typical issue, such as for mobile devices where the typical issue may be omitted ending punctuation, and the like. In this instance, a recommended solution may be to insert punctuation that would be fitting the context and grammatically correct. A specific case for mobile devices may be a list of common abbreviations used on mobile devices and writing style conventions often used on mobile devices but not generally accepted otherwise. A specific case for speech recognition input may be a list of words that sound alike (homonyms) but have different meaning and a list of punctuation conventions that are typically not recognized by voice recognition input devices or software.

In embodiments, the grammar checking facility may provide text enrichment to text content in the case of high-pressure work environments (such as healthcare, law, finance, and the like) or devices encouraging short form messaging (such as mobile phone, smart phones, iPads, and the like), the system may also enrich slang or abbreviated words. The software may provide this by maintaining a list of abbreviations by genre or device, allowing users to set their own user-defined abbreviations in a dedicated interface, enabling users to identify abbreviations in redlined text (which may be added to their user defined profile), and the like. With this as background, the grammar checking facility may be able to change relevant abbreviations and slang to their full form or proper counter parts, enhancing the understandability and professional appeal of the text. Such a system may also be self-learning, aggregating feedback across user genres and device types, to develop a universal set of abbreviations and rules for use in enriching text.

The output of the process may be a properly formatted, correct, and accurate document. Depending on user preference, the end result may be delivered in one of the several ways. For instance, the corrected document may be sent to the recipient in the case of a messaging scenario or saved/published/submitted in case of content publishing scenario, and the original (uncorrected) and redline versions delivered back to the end-user. A specific sub-scenario may be in case of email messaging. In this case, the "Sent" folder of the user's email system may store alternate versions of the document, such as the clean final version, original version, and redline version), and may allow the user to review each copy when needed. A redline version may be delivered back to the user for approval. A user may then have an option to approve all, some or none of the proposed changes. A document with the changes approved by the user may become the final version and be delivered to the recipient in the case of the messaging scenario or saved/submitted in case of the document creation/publishing scenario. The redline version may be delivered in one of the several forms, depending on the user preference. For instance, as a document using the standard "track changes" redlining functionality available in text processing or messaging software users use to create and submit the document, as a link to an online text editing interface that includes the redline version of the user's text and provides standard functionality to review text and approve or decline proposed changes, and the like. In the case of an email client like Outlook, the message may also be placed in a separate folder, possibly named a proofit folder, containing messages awaiting input from the user. These messages may be dynamic, enabling the user to make changes inside the message. The redline version may include information, such as a suggested correction, name of the issue (such as a spelling mistake, verb form grammatical error, and the like), explanation of the issue, including relevant grammatical or other rules, and the like.

In case of an exception (such as a mistake that cannot be corrected without user input, and the like) and where the selected delivery method is set to automatic delivery of corrected text without confirmation by the user, the grammar checking facility may process the exception in several ways. For instance, based on user preference the grammar checking facility may fallback to an alternate delivery method, such as redline sent back to user for approval, regardless of the method originally selected for the document. Alternately, the grammar checking facility may send/save/submit the document with the problematic text not being corrected and sends an additional exception notification to the user.

In embodiments, there may be other features that are enabled for all or specific users. For instance, the grammar checking facility may decide between alternate delivery methods automatically, such as based on pre-set thresholds. Thresholds may be number of mistakes per 100 words (such as if there are more then 5 mistakes per 100 words, fall back to an alternate method otherwise, and the like), number of mistakes that were not corrected within a normal time period (such as it took human workers too long to correct, and the like), number of disagreements between redundant human workers, such as if there are more then X mistakes where two human workers provided different corrections for the same mistake, and the like. In embodiments, the grammar checking facility may prohibit automatic corrections by software, such as requiring all corrections to be performed by humans to ensure quality.

In embodiments, the user may be presented with options for reviewing and not reviewing text content. The corrected and/or enhanced version may be automatically sent without the user reviewing the changes, the revised version may be reviewed by the user before approving to transmit, the user may be presented with optional views such as a redline version before revising and/or sending, and the like. In an example workflow for email without redline confirmation, a user may write a message and click a 'Send with Proofit' button, such as in an application on their mobile device, on a personal computer, and the like. The email client of the user may then report that the message will be sent corrected, allowing the user to move on to other tasks. The message may then be sent to the grammar checking facility where it may be corrected and so improved. In embodiments, the grammar checking facility may take into account the mobile device type, mobile device model, text genre, and other preferences. The corrected message may then be delivered to the recipient. Corrected, original, redline, and the like versions of the message may be available for user review in a list of sent messages. In an example workflow for email with redline confirmation, a user may write a message and click a 'Send with Proofit' button, such as in an application on the their mobile device, on a personal computer, and the like. The email client of the user may then report that the message has been sent to the grammar checking facility, where it may be corrected and so improved. In embodiments, the grammar checking facility may take into account the device type, model, text genre, and other preferences. The user may then receive a message back, such as including a link to an online text editor with redline version, an attached MS Word document with redline version such as created using the Word's "track changes" ability or otherwise, and the like. User may then accept some or all of the changes and save the text. The corrected message may then be delivered to the recipient. Corrected, original, redline, and the like versions of the message may be available for user review, such as in a sent messages folder. In embodiments, this step may require a message template that allows users to click between versions (such as between clean, redlined, original, and the like) in a single email.

While the invention has been described in connection with certain preferred embodiments, other embodiments would be understood by one of ordinary skill in the art and are encompassed herein.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of grammar checking, the method comprising:
   receiving text through a communications network at a first computing device-based grammar checking facility from a second computing device, wherein the grammar checking facility automatically detects a plurality of possible grammatical errors in the text through software algorithms, and categorizes each of the detected plurality of possible grammatical errors as one of at least a high confidence possible error and a low confidence possible error, wherein a high confidence possible error is considered an identified error and a low confidence possible error is one the grammar checking facility can not determine exists with high enough certainty;
   providing, automatically from the first computing device-based grammar checking facility through the communications network to each of a plurality of human proofreader computing devices of a plurality of human proofreaders in a crowd-source population, at least one corresponding excerpt of the text containing a possible grammatical error categorized as a low confidence possible error as a result of the automated detection of the grammar checking facility so that an augmented error detection process is collectively performed by the plurality of human proofreaders in parallel for those grammatical errors categorized as low confidence possible errors to determine whether an actual error exists, wherein an error determined by a human proofreader to be an actual error is either corrected by the human proofreader to produce a correction result or is sent back to the grammar checking facility for automatic correction or for distribution as an identified error to at least one human proofreader, wherein the grammar checking facility may automatically correct at least some of the identified errors to produce corrected text portions;
   managing, by the grammar checking facility, the automatic distribution of at least some of the identified errors to the plurality of human proofreaders, so that a human augmented grammar correction is collectively performed by the plurality of human proofreaders in parallel to produce correction results, wherein additional grammatical errors not found in the grammar checking facility automatic detection of the plurality of possible grammatical errors are detected by the plurality of human proofreaders, wherein the plurality of human proofreaders correct the additional grammatical errors and the distributed identified grammatical errors, and wherein each of the plurality of human proofreader computing devices is separate from the first computing device and the second computing device;
   receiving, by the grammar checking facility, the correction results of the plurality of human proofreaders and automatically incorporating the correction results with any automatically corrected text portions of the grammar checking facility to contribute to an at least one corrected version of the received text; and
   sending the at least one corrected version back to the second computing device.

2. The method of claim 1, wherein the second computing device interfaces with the grammar checking facility through an application programming interface.

3. The method of claim 2, wherein the second computing device is an enterprise server and the enterprise server is hosting a web accessible service of the grammar checking facility through the application programming interface.

4. The method of claim 2, wherein the application programming interface is associated with at least one of a third-party application, a word processor, a browser, a search engine, an email client, an SMS application, a blogging application, a micro-blogging application, a content management facility, a publishing facility, and an advertisement facility.

5. The method of claim 1, wherein the at least one corrected version includes a plurality of corrected excerpts integrated back into the original received text and wherein the second computing device receives the entire text with mistakes corrected.

6. The method of claim 1, wherein the at least one corrected version is a redline version.

7. The method of claim 1, wherein at least one of the plurality of human proofreader computing devices is a mobile computing device.

8. A system of grammar checking, the system comprising:
   a first computing device-based grammar checking facility integrated into a computing environment to analyze text generated by a remote second computing device for grammatical errors, wherein the second computing device transmits the text to the grammar checking facility via a communications network, and the grammar checking facility automatically detects a plurality of possible grammatical errors in the text through software algorithms, categorizes each of the detected plurality of possible errors as one of at least a high confidence possible error and a low confidence possible error, wherein a high confidence possible error is considered an identified error, and a low confidence possible error is one the grammar checking facility can not determine exists with high enough certainty, and automatically sends, to each of a plurality of human proofreader computing devices of a plurality of human proofreaders in a crowd-source population, at least one corresponding excerpt of the text containing at least one of the plurality of possible grammatical errors categorized as a low confidence possible error so that an augmented error detection process collectively performed by the plurality of human proofreaders in parallel for those grammatical errors categorized as low confidence possible errors to determine whether an actual error exists, wherein an error determined by a human proofreader to be an actual error is either corrected by the human proofreader to produce a correction result or is sent back to the grammar checking facility for automatic correction or for distribution as an identified error to at least one human proofreader, wherein the grammar checking facility may automatically correct at least some of the some of the identified errors to produce corrected text portions, wherein the grammar checking facility manages the automatic distribution of at least some of the identified errors to the plurality of human proofreaders, so that a human augmented grammar correction is collectively performed by the plurality of human proofreaders in parallel to produce correction results, wherein additional grammatical errors not found in the grammar checking facility automatic detection of the plurality of possible grammatical errors are detected by the plurality of human proofreaders, wherein the plurality of human proofreaders correct the additional grammatical errors and the distributed identified grammatical errors, and wherein each of the plurality of human proofreader computing devices is separate from the first computing device and the second computing device, wherein the correction results of the human augmented grammar checking by the plurality of human proofreaders are received by the grammar checking facility and are automatically incorporated with any automatically corrected text portions of the grammar checking facility to contribute to at least one corrected version of the received text, and wherein the at least one corrected version is sent back to the second computing device.

9. The system of claim 8, wherein the second computing device is an enterprise server.

10. The system of claim 9, wherein the enterprise server is hosting a web accessible service of the grammar checking facility, wherein the second computing device transmits the text to the grammar checking facility through an application programming interface.

11. The system of claim 10, wherein the application programming interface is associated with at least one of a third-party application, a word processor, a browser, a search engine, an email client, an SMS application, a blogging application, a micro-blogging application, a content management facility, a publishing facility, and an advertisement facility.

12. A method of grammar checking, the method comprising:

receiving text through a communications network at a first computing device-based grammar checking facility from a second computing device, wherein the grammar checking facility automatically detects a plurality of possible grammatical errors in the text through software algorithms, categorizes each grammatical error of the detected plurality of possible grammatical errors as one of at least a high confidence possible error and a low confidence possible error, wherein the high confidence possible error is considered an identified error and a low confidence possible error is one the grammar checking facility can not determine exists with high enough certainty;

automatically transmitting each of the plurality of possible grammatical errors categorized as low confidence errors from the grammar checking facility through the communications network to a plurality of human proofreader computing devices of a plurality of human proofreaders in a crowd-source population, where those grammatical errors categorized as low confidence errors are distributed in parallel amongst the plurality of human proofreader computer devices, wherein each of the plurality of possible grammatical errors categorized as low confidence errors is transmitted to at least one of the plurality of human proofreader computing devices for error identification where the grammar checking facility could not determine if the error exists with high enough certainty, wherein at least one of the possible grammatical errors categorized as low confidence errors is transmitted to at least two human proofreaders of the plurality of human proofreaders for assessment, wherein one of the at least two human proofreaders performs error identification and one of the at least two human proofreaders performs error correction, wherein additional grammatical errors not found in the grammar checking facility automatic detection of the plurality of possible grammatical errors are detected by the plurality of human proofreaders, and wherein the additional grammatical errors and the identified errors are corrected by at least one of the grammar checking facility to produce corrected text portions and at least one of the plurality of human proofreaders to produce correction results, and wherein each of the plurality of human proofreader computing devices is separate from the first computing device and the second computing device;

receiving, by the grammar checking facility, any correction results of the plurality of human proofreaders, and incorporating any correction results of the plurality of human proofreaders with any corrected text portions of the grammar checking facility to contribute to a corrected version of the text; and transmitting the assembled corrected text to the second computing device.

13. The method of claim 12, further comprising detecting, by the plurality of human proofreaders, additional grammatical errors not found in the grammar checking facility automatic detection of the plurality of possible grammatical errors, and correcting, by the plurality of human proofreaders, the additional grammatical errors in addition to correcting the plurality of grammatical errors categorized as low confidence possible errors detected through the grammar checking facility.

14. The method of claim 12, wherein at least one of the plurality of human proofreader computing devices is a mobile computing device.

15. The method of claim 12, wherein a user of the second computing device previously entered the received text into the second computing device.

16. The method of claim 15, wherein the user of the second computing device entered the received text through at least one of directly typing, uploading, and a copy-and-paste operation into an application on the second computing device.

17. The method of claim 15, wherein the user entered the received text though an application program interface (API) associated with the grammar checking facility.

18. The method of claim 12, further comprising grammar checking the assembled corrected text prior to transmitting the assembled corrected text to the second computing device.

19. The method of claim 18, wherein the grammar checking of the assembled corrected text is provided at least in part by the grammar checking facility.

20. The method of claim 18, wherein the grammar checking of the assembled corrected text is provided at least in part by the plurality of human proofreaders.

\* \* \* \* \*

UNITED STATES PATENT AND TRADEMARK OFFICE
CERTIFICATE OF CORRECTION

PATENT NO.         : 10,387,565 B2
APPLICATION NO.    : 15/249986
DATED              : August 20, 2019
INVENTOR(S)        : Bradley Hoover et al.

Page 1 of 1

It is certified that error appears in the above-identified patent and that said Letters Patent is hereby corrected as shown below:

In the Specification

In Column 5, Line 55, after "screen" insert -- . --.

In Column 5, Line 60, after "report" insert -- . --.

In Column 5, Line 65, after "text" insert -- . --.

In Column 13, Line 50, delete "or and" and insert -- or/and --, therefor.

In Column 20, Line 59, delete "competing" and insert -- completing --, therefor.

In Column 30, Line 34, delete "then" and insert -- than --, therefor.

In Column 30, Line 39, delete "then" and insert -- than --, therefor.

In Column 30, Line 67, after "on" delete "the".

In the Claims

In Column 37, Line 11, in Claim 8, delete "some of the some of the" and insert -- some of the --, therefor.

Signed and Sealed this
Nineteenth Day of November, 2019

Andrei Iancu
*Director of the United States Patent and Trademark Office*